(12) United States Patent
Kim et al.

(10) Patent No.: US 10,324,324 B2
(45) Date of Patent: Jun. 18, 2019

(54) SIGNAL CONTROL CIRCUIT, POWER CONTROL CIRCUIT, DRIVE CIRCUIT, TIMING CONTROLLER, TOUCH SYSTEM, AND TOUCH DISPLAY DEVICE AND DRIVING METHOD THEREOF

(71) Applicant: LG Display Co., Ltd., Seoul (KR)

(72) Inventors: SungChul Kim, Goyang-si (KR); HyungUk Jang, Paju-si (KR); SangHyuck Bae, Paju-si (KR); Sungsu Han, Goyang-si (KR); Suyun Ju, Gwangwon-do (KR); DoYoung Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/669,872

(22) Filed: Aug. 4, 2017

(65) Prior Publication Data

US 2017/0329167 A1 Nov. 16, 2017

Related U.S. Application Data

(63) Continuation of application No. 14/984,657, filed on Dec. 30, 2015, now Pat. No. 9,760,213.

(30) Foreign Application Priority Data

Oct. 13, 2015 (KR) .......................... 10-2015-0142532
Dec. 23, 2015 (KR) .......................... 10-2015-0185479

(51) Int. Cl.
*G06F 3/041* (2006.01)
*G02F 1/1333* (2006.01)
(Continued)

(52) U.S. Cl.
CPC ........ *G02F 1/13338* (2013.01); *G02F 1/1343* (2013.01); *G06F 3/041* (2013.01);
(Continued)

(58) Field of Classification Search
CPC .............................. G06F 3/0418; G06F 3/044
See application file for complete search history.

(56) References Cited

U.S. PATENT DOCUMENTS 8,766,950 B1 7/2014 Morein et al.
9,348,476 B2 5/2016 Lee
(Continued)

FOREIGN PATENT DOCUMENTS

| CN | 103698927 A | 4/2014 |
|---|---|---|
| CN | 104731399 A | 6/2015 |
| EP | 2743752 A1 | 6/2014 |

OTHER PUBLICATIONS

European Extended Search Report, European Application No. 15203086.2, dated May 27, 2016, 13 pages.
(Continued)

*Primary Examiner* — Lisa S Landis
(74) *Attorney, Agent, or Firm* — Fenwick & West LLP

(57) ABSTRACT

Exemplary embodiments of the present invention relate to a touch technology, and more specifically, to a signal control circuit, a power control circuit, a drive circuit, a timing controller, a touch system, and a touch sensitive display device and a driving method thereof that can simply swing various voltages in a display device for a touch mode period by using a modulated ground voltage obtained by swinging a ground voltage, thereby effectively providing touch driving and preventing unnecessary parasitic capacitance from being generated not only in an active area but also in all other areas.

10 Claims, 34 Drawing Sheets

(51) Int. Cl.
  *G06F 3/044*  (2006.01)
  *G02F 1/1343*  (2006.01)
(52) U.S. Cl.
  CPC ............ *G06F 3/044* (2013.01); *G06F 3/0412* (2013.01); *G06F 3/0418* (2013.01); *G06F 2203/04112* (2013.01)

(56) References Cited

U.S. PATENT DOCUMENTS

| | | | |
|---|---|---|---|
| 10,073,562 | B2 | 9/2018 | Mo et al. |
| 2008/0309627 | A1* | 12/2008 | Hotelling .......... G02F 1/134363 345/173 |
| 2010/0194697 | A1 | 8/2010 | Hotelling et al. |
| 2010/0253638 | A1 | 10/2010 | Yousefpor et al. |
| 2012/0068961 | A1 | 3/2012 | Mizuhashi et al. |
| 2012/0327006 | A1 | 12/2012 | Israr et al. |
| 2013/0307820 | A1 | 11/2013 | Kim |
| 2014/0168149 | A1 | 6/2014 | Han et al. |
| 2015/0097817 | A1 | 4/2015 | Chung |
| 2015/0179133 | A1 | 6/2015 | Lee |
| 2016/0334934 | A1 | 11/2016 | Mo et al. |
| 2018/0341365 | A1 | 11/2018 | Mo et al. |

OTHER PUBLICATIONS

United States Office Action, U.S. Appl. No. 14/984,657, dated Nov. 18, 2016, 21 pages.
United States Office Action, U.S. Appl. No. 14/984,657, dated May 20, 2016, 19 pages.
First Office Action, Chinese Patent Application No. 201511025268.1, dated Dec. 5, 2018, 26 pages.

* cited by examiner

FIG.19
CASE 1
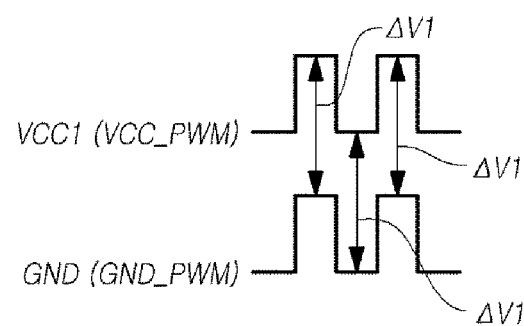
CASE 2
NO VCC1
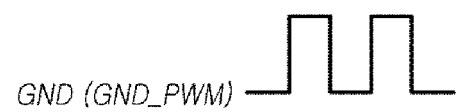
GND (GND_PWM)

SIGNAL CONTROL CIRCUIT, POWER CONTROL CIRCUIT, DRIVE CIRCUIT, TIMING CONTROLLER, TOUCH SYSTEM, AND TOUCH DISPLAY DEVICE AND DRIVING METHOD THEREOF

CROSS-REFERENCE TO RELATED APPLICATION

This application is a continuation of U.S. patent application Ser. No. 14/984,657 filed on Dec. 30, 2015, which claims priority from and the benefit under 35 U.S.C. § 119(a) of Republic of Korea Patent Application No. 10-2015-0142532, filed on Oct. 13, 2015, and also claims priority from Republic of Korea Patent Application No. 10-2015-0185479, filed on Dec. 23, 2015, all of which are hereby incorporated by reference for all purposes as if fully set forth herein.

BACKGROUND

1. Field of the Disclosure

Exemplary embodiments relate to a signal control circuit, a power control circuit, a drive circuit, a timing controller, a touch system, and a touch display device and a driving method thereof.

2. Description of the Prior Art

With the development of the information society, display devices for displaying images are being increasingly required in various forms, and in recent years, various display devices, such as Liquid Crystal Displays (LCDs), Plasma Display Panels (PDPs), and Organic Light Emitting Display Devices (OLEDs), have been utilized.

Such display devices provide touch-based input methods that enable users to input information or instructions easily, intuitively, and conveniently, instead of typical input methods using a button, a keyboard, a mouse, etc.

In order to provide the touch-based input methods, whether a touch is made by a user must be able to be recognized, and touch coordinates must be able to be accurately detected.

To this end, capacitance based touch methods have been widely used to detect the presence or absence of a touch and touch coordinates based on a change in capacitance between a plurality of touch electrodes (e.g., horizontal electrodes and vertical electrodes) formed in a touch screen panel, or based on a change in capacitance between the touch electrodes and a pointer, such as a finger.

Meanwhile, during touch driving and sensing, unnecessary parasitic capacitance may be generated in addition to capacitance necessary for the touch sensing.

In the capacitance touch methods, the unnecessary parasitic capacitance may increase a load of the touch driving, degrade the accuracy of the touch sensing, or make the touch sensing itself impossible in severe cases.

The problems caused by the unnecessary parasitic capacitance may be more serious in the case of display devices that have a Touch Screen Panel (TSP) embedded in a display panel thereof.

SUMMARY

An aspect of exemplary embodiments of the present invention is to provide a signal control circuit, a power control circuit, a drive circuit, a timing controller, a touch system, and a touch sensitive display device and a driving method thereof that can effectively remove parasitic capacitance.

Another aspect of exemplary embodiments of the present invention is to provide a signal control circuit, a power control circuit, a drive circuit, a timing controller, a touch system, and a touch display device and a driving method thereof that can prevent parasitic capacitance from being generated in the whole area of a device that includes a non-active area as well as an active area.

Yet another aspect of exemplary embodiments of the present invention is to provide a signal control circuit, a power control circuit, a drive circuit, a timing controller, a touch system, and a touch display device and a driving method thereof that can effectively generate various types of signals required for a load free driving signal for touch driving and for preventing parasitic capacitance.

In accordance with one aspect of the present invention, exemplary embodiments of the present invention may provide a touch display device that includes: a display panel that has a plurality of common electrodes arranged therein, which are used in touch driving and display driving; a power control circuit that generates and outputs a pulse modulated common electrode voltage and modulated display supply voltages, the pulse widths of which are modulated according to a modulated ground voltage that corresponds to an input pulse width modulation signal; a first drive circuit that receives a first modulated display supply voltage among the modulated display supply voltages and the pulse modulated common electrode voltage and sequentially provides a touch driving signal, which is the same as or corresponds to the pulse modulated common electrode voltage, to the plurality of common electrodes in a touch mode period; and a second drive circuit that receives a second modulated display supply voltage among the modulated display supply voltages in the touch mode period.

In accordance with another aspect of the present invention, exemplary embodiments of the present invention may provide a method for driving a touch display device that has a plurality of common electrodes that are embedded in a display panel thereof and used in touch driving and display driving, the method including: generating a pulse modulated common electrode voltage and a modulated display supply voltage that are synchronized with a pulse-width modulated ground voltage; and progressing touch driving by using the pulse modulated common electrode voltage for a touch mode period.

In accordance with yet another aspect of the present invention, exemplary embodiments of the present invention may provide a power control circuit of a touch display device, including: a ground voltage input terminal to which a pulse-width modulated ground voltage is input; a first pulse generation unit that generates, for a touch mode period, a pulse modulated common electrode voltage that is synchronized with the modulated ground voltage and has a pulse width modulated on the basis of a common electrode voltage; and a second pulse generation unit that generates, for the touch mode period, a modulated display supply voltage that is synchronized with the modulated ground voltage and has a pulse width modulated on the basis of a display voltage.

In accordance with yet another aspect of the present invention, exemplary embodiments of the present invention may provide a signal control circuit of a touch display device, including: a pulse generator that generates a modulated ground voltage; and a signal selection circuit that receives a ground voltage and the modulated ground voltage and selects one of the ground voltage and the modulated ground voltage to output the selected one.

The signal selection circuit in the signal control circuit may select and output the modulated ground voltage for the touch mode period.

In accordance with yet another aspect of the present invention, exemplary embodiments of the present invention may provide a drive circuit of a touch display device, including: a data drive circuit that performs data driving for a display mode period; and a touch sensing signal detection circuit that detects, for a touch mode period, a touch sensing signal for touch sensing from a common electrode to which a touch driving signal is applied.

In the drive circuit of the touch display device, the touch driving signal may have the same phase as a modulated ground voltage of a pulse width modulation signal type.

In accordance with yet another aspect of the present invention, exemplary embodiments of the present invention may provide a timing controller of a touch display device, including: a mode timing control unit that controls the timings of a display mode and a touch mode; an image data output unit that outputs image data for data driving for a display mode period; and a signal control circuit that generates, for a touch mode period, a modulated ground voltage of a pulse width modulation signal type for swinging a touch driving signal and a load free driving signal.

In accordance with yet another aspect of the present invention, exemplary embodiments of the present invention may provide a touch system including: a signal control circuit that generates a modulated ground voltage that is a pulse width modulation signal; a power control circuit that generates and outputs a pulse modulated common electrode voltage and a modulated display supply voltage that have the same phase as the modulated ground voltage; and a drive circuit that receives the pulse modulated common electrode voltage and the modulated display supply voltage and sequentially provides, to a plurality of common electrodes, a touch driving signal that corresponds to the pulse modulated common electrode voltage for a touch mode period.

As described above, the exemplary embodiments of the present invention provide a signal control circuit, a power control circuit, a drive circuit, a timing controller, a touch system, and a touch display device and a driving method thereof that can effectively remove parasitic capacitance.

Furthermore, the exemplary embodiments of the present invention provide a signal control circuit, a power control circuit, a drive circuit, a timing controller, a touch system, and a touch display device and a driving method thereof that can prevent parasitic capacitance from being generated in the whole area of a device that includes a non-active area as well as an active area.

In addition, the exemplary embodiments of the present invention provide a signal control circuit, a power control circuit, a drive circuit, a timing controller, a touch system, and a touch display device and a driving method thereof that can effectively generate various types of signals required for a load free driving signal for touch driving and for preventing parasitic capacitance.

In one embodiment, a touch sensitive display device is disclosed. The device includes a display panel that comprises a plurality of common electrodes that are driven for both touch sensing and image display. A driving circuit supplies a touch driving signal to at least a first common electrode of the common electrodes. The device includes ground wiring and a circuit to provide a modulated ground voltage to the ground wiring. The touch driving signal also has a substantially same phase as the modulated ground voltage.

In one embodiment, a power control circuit generates at least one of a modulated common electrode voltage and a modulated power supply voltage based on the modulated ground voltage. The at least one of the modulated common electrode voltage and the modulated power supply voltage may have a substantially same phase as the modulated ground voltage. Additionally, the at least one of the modulated common electrode voltage and the modulated power supply voltage may have a substantially same amplitude as the modulated ground voltage.

In one embodiment, the power control circuit includes a first power input terminal to receive the modulated ground voltage and a second power input terminal to receive a modulated power supply voltage, the modulated power supply voltage having a substantially same phase as the modulated ground voltage.

In one embodiment, the display panel comprises a data line coupled to at least one pixel, and the driving circuit also supplies a data line load free driving signal to the data line, the data line load free driving signal having a substantially same phase as the modulated ground voltage.

In one embodiment, the display panel comprises a gate line coupled to at least one pixel. A gate driving circuit supplies a gate line load free driving signal to the gate line, the gate line load free driving signal having a substantially same phase as the modulated ground voltage.

In one embodiment, the driving circuit supplies a common electrode load free driving signal to at least one second common electrode of the common electrodes while the touch driving signal is supplied to the first common electrode, the common electrode load free driving signal having a substantially same phase as the modulated ground voltage.

In one embodiment, the circuit to provide a modulated ground voltage comprises a multiplexer having a first input to receive the modulated ground voltage, a second input to receive a DC ground voltage, and an output coupled to the ground wiring. The multiplexer selects between the modulated ground voltage at the first input and the direct current (DC) ground voltage at the second input.

In one embodiment, the circuit to provide a modulated ground voltage further includes circuitry to adjust an amplitude of the modulated ground voltage.

In one embodiment, the display panel is driven in a touch mode period and a display mode period in a time division manner. The driving circuit provides the touch driving signal to the first common electrode during the touch mode period for touch sensing and provides a DC common electrode voltage to the first common electrode during the display mode period for image display.

In one embodiment, the display panel is supplied in a touch mode and a display mode that overlap with each other. While the touch mode and the display mode overlap, the touch driving signal driven to the first common electrode is a modulated common electrode voltage operating as a display voltage for image display.

In one embodiment, the display panel comprises a pixel electrode, and a pixel voltage in the pixel electrode has a substantially same phase as the modulated ground voltage.

In one embodiment, a method of operating a touch sensitive display device that comprises display panel including a plurality of common electrodes is disclosed, wherein the common electrodes are driven for touch sensing and image display, the method comprises: driving a touch driving signal to at least a first common electrode of the common electrodes; and providing a modulated ground voltage to ground wiring of the touch sensitive display device, the touch driving signal having a substantially same phase as the modulated ground voltage.

In one embodiment, a driving circuit for a touch sensitive display device that comprises a display panel is disclosed, wherein the display panel comprises plurality of common electrodes driven for touch sensing and image display, the driving circuit comprises: a first circuit to supply a touch driving signal to at least a first common electrode of the common electrodes, wherein the touch driving signal has a substantially same phase as a modulated ground voltage provided to ground wiring of the touch sensitive display device.

In one embodiment, a control circuit for a touch sensitive display device that comprises a display panel is disclosed, wherein the display panel comprises plurality of common electrodes driven for touch sensing and image display, the control circuit comprises: a first circuit to provide a modulated ground voltage to ground wiring of the touch sensitive display device, wherein the modulated ground voltage has a same phase as a touch driving signal provided to at least a first common electrode of the common electrodes.

BRIEF DESCRIPTION OF THE DRAWINGS

The above and other objects, features, and advantages of the present invention will be more apparent from the following detailed description taken in conjunction with the accompanying drawings, in which:

FIG. 19 illustrates two cases in which signal(s) are input to two input terminals of a power control circuit of the touch sensitive display device, according to exemplary embodiments of the present invention;

DETAILED DESCRIPTION OF THE EXEMPLARY EMBODIMENTS

Figure 1:
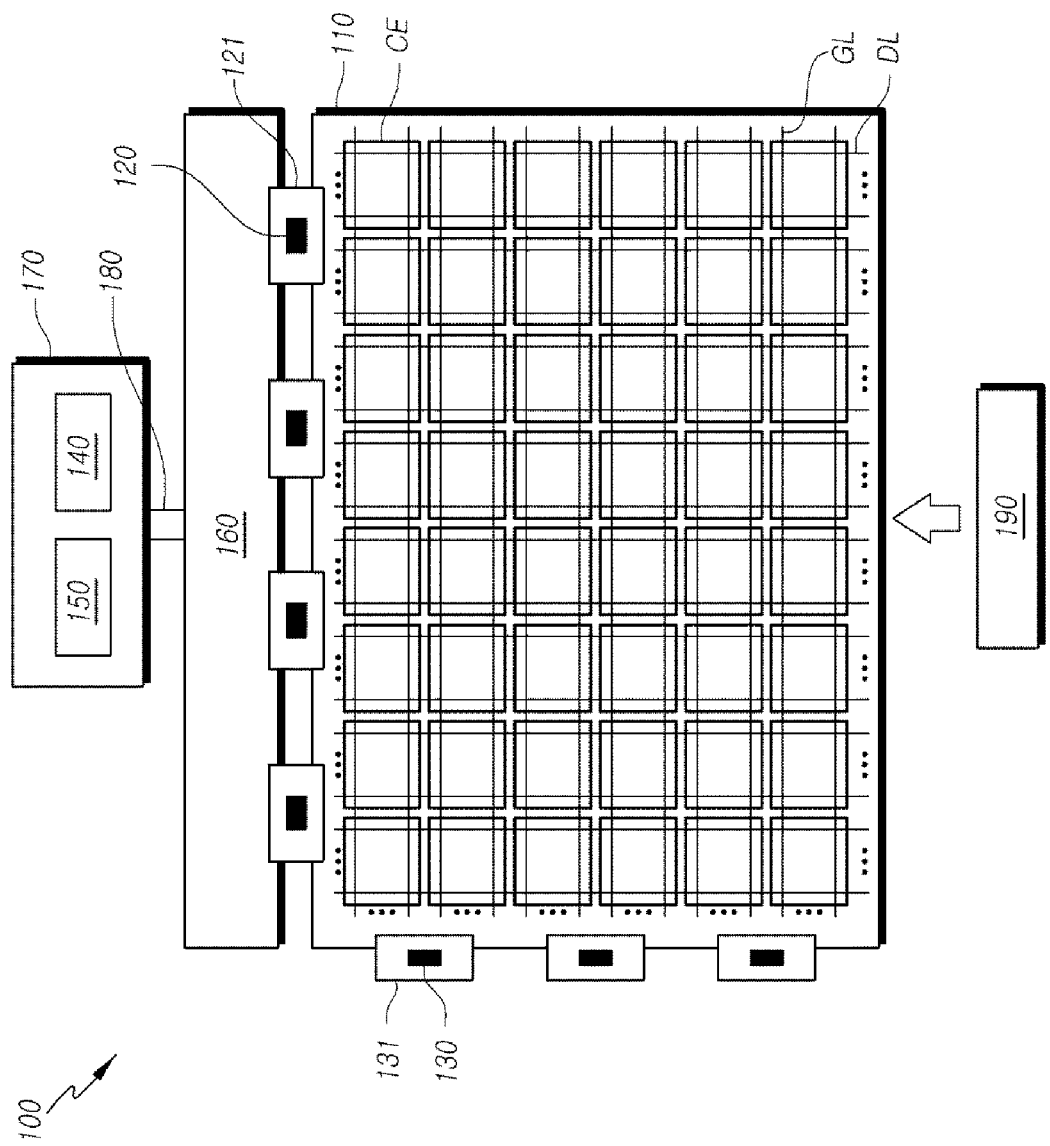
FIG. 1 is a diagram illustrating the system configuration of a touch sensitive display device according to exemplary embodiments of the present invention.

Hereinafter, exemplary embodiments of the present invention will be described in detail with reference to the accompanying drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram illustrating the system configuration of a touch sensitive display device 100 according to exemplary embodiments of the present invention.

Referring to FIG. 1, the touch sensitive display device 100, according to the exemplary embodiments of the present invention, may provide both an image display function and a touch sensing function.

In order to provide the image display function, the touch sensitive display device 100, according to the exemplary embodiments of the present invention, includes: a display panel 110 on which a plurality of data lines DL, gate lines GL, and sub-pixels are disposed, wherein each data line may be coupled to at least one pixel, and each gate line may be coupled to at least one pixel; data drive circuits 120 that drive the plurality of data lines DL; gate drive circuits 130 that drive the plurality of gate lines GL; and a timing controller 140 that controls the data drive circuits 120 and the gate drive circuits 130.

The timing controller 140 provides various types of control signals to the data drive circuits 120 and the gate drive circuits 130 and controls the data drive circuits 120 and the gate drive circuits 130.

The timing controller 140 starts a scan according to the timing of implementation in each frame, converts input image data, which is input from the outside, so as to be suitable for a data signal format used in the data drive circuits 120, outputs the converted image data, and controls data driving at a proper time according to the scan.

The data drive circuits 120 supply data voltages to the plurality of data lines DL to drive the plurality of data lines DL.

The gate drive circuits 130 sequentially provide scan signals to the plurality of gate lines GL to drive the plurality of gate lines GL in a serial order.

The gate drive circuits 130 sequentially provide scan signals having an On-voltage or Off-voltage to the plurality of gate lines GL according to the control of the timing controller 140.

The data drive circuits 120 convert image data received from the timing controller 140 into analog data voltages and supply the data voltages to the plurality of data lines DL when a specific gate line is opened by the gate drive circuits 130.

The data drive circuits 120 are disposed only on one side (e.g., the upper or lower side) of the display panel 110 in FIG. 1. However, the data drive circuits 120 may also be disposed on opposite sides (e.g., the upper and lower sides) of the display panel 110 according to a driving method, a panel design method, etc.

The gate drive circuits 130 are disposed only on one side (e.g., the left or right side) of the display panel 110 in FIG. 1. However, the gate drive circuits 130 may also be disposed on opposite sides (e.g., the left and right sides) of the display panel 110 according to a driving method, a panel design method, etc.

The above-described timing controller 140 receives, from the outside (e.g., a host system), various types of timing signals, including a vertical synchronization signal Vsync, a horizontal synchronization signal Hsync, an input data enable (DE) signal, a clock signal CLK, and the like, in addition to the input image data.

In addition to converting the input image data, which is input from the outside, so as to be suitable for the data signal format used in the data drive circuits 120 and outputting the converted image data, the timing controller 140 receives timing signals, such as a vertical synchronization signal Vsync, a horizontal synchronization signal Hsync, an input DE signal, a clock signal, and the like, generates various types of control signals, and outputs the control signals to the data drive circuits 120 and the gate drive circuits 130 in order to control the data drive circuits 120 and the gate drive circuits 130.

For example, the timing controller 140 outputs various types of gate control signals (GCSs), including a gate start pulse (GSP), a gate shift clock (GSC), a gate output enable (GOE) signal, and the like, in order to control the gate drive circuits 130.

Further, the timing controller 140 outputs various types of data control signals (DCSs), including a source start pulse (SSP), a source sampling clock (SSC), a source output enable (SOE) signal, and the like, in order to control the data drive circuits 120.

Each of the data drive circuits 120 may be connected to bonding pads of the display panel 110 by a tape automated bonding (TAB) method or a chip on glass (COG) method, or may be directly disposed on the display panel 110. In some cases, the data drive circuit 120 may also be disposed on the display panel 110 by integration.

In addition, the data drive circuit 120 may also be implemented by a chip on film (COF) method in which the data drive circuit 120 is mounted on a film 121 connected to the display panel 110.

The data drive circuit 120 may include a shift register, a latch circuit, a digital to analog converter, an output buffer, or the like.

Each of the gate drive circuits 130 may be connected to bonding pads of the display panel 110 by a tape automated bonding (TAB) method or a chip on glass (COG) method, or may be implemented in a gate in panel (GIP) type and directly disposed on the display panel 110. In some cases, the gate drive circuit 130 may also be disposed on the display panel 110 by integration.

In addition, the gate drive circuit 130 may also be implemented by a chip on film (COF) method in which the gate drive circuit 130 is mounted on a film 131 connected to the display panel 110.

The gate drive circuit 130 may include a shift register, a level shifter, or the like.

The touch sensitive display device 100, according to the exemplary embodiments of the present invention, may include: at least one source printed circuit board (S-PCB) 160 required for an electrical connection to the data drive circuits 120; and a control printed circuit board (C-PCB) 170 on which control components and various types of electrical devices are mounted.

The data drive circuits 120 may be mounted on the at least one source printed circuit board 160, or the film 121 on which the data drive circuits 120 are mounted may be connected to the source printed circuit board 160.

The timing controller 140 that controls operations of the data drive circuits 120 and the gate drive circuits 130 and a power control circuit 150 that supplies a diversity of voltages or currents to the display panel 110, the data drive circuits 120, and the gate drive circuits 130 or controls a diversity of voltages or currents to be supplied thereto may be mounted on the control printed circuit board 170.

The at least one source printed circuit board 160 and the control printed circuit board 170 may be electrically connected to each other through at least one connecting member 180.

Here, the connecting member 180 may be a flexible printed circuit (FPC), a flexible flat cable (FFC), or the like.

The at least one source printed circuit board 160 and the control printed circuit board 170 may also be integrated into a single printed circuit board.

The touch sensitive display device 100, according to the exemplary embodiments of the present invention, may be one of various types of devices, such as a liquid crystal display device, an organic light emitting display device, a plasma display device, and the like.

Figure 2:
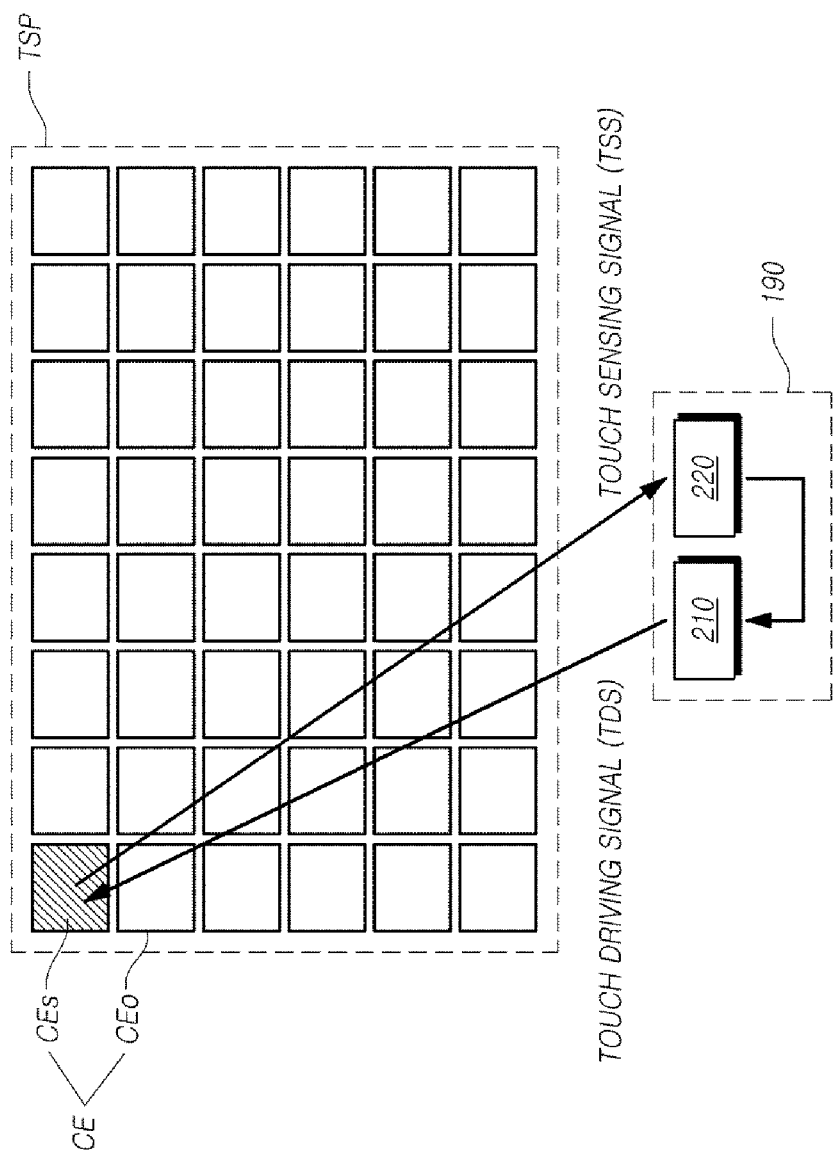
FIG. 2 schematically illustrates a touch system of the touch sensitive display device, according to exemplary embodiments of the present invention.
Figure 3:
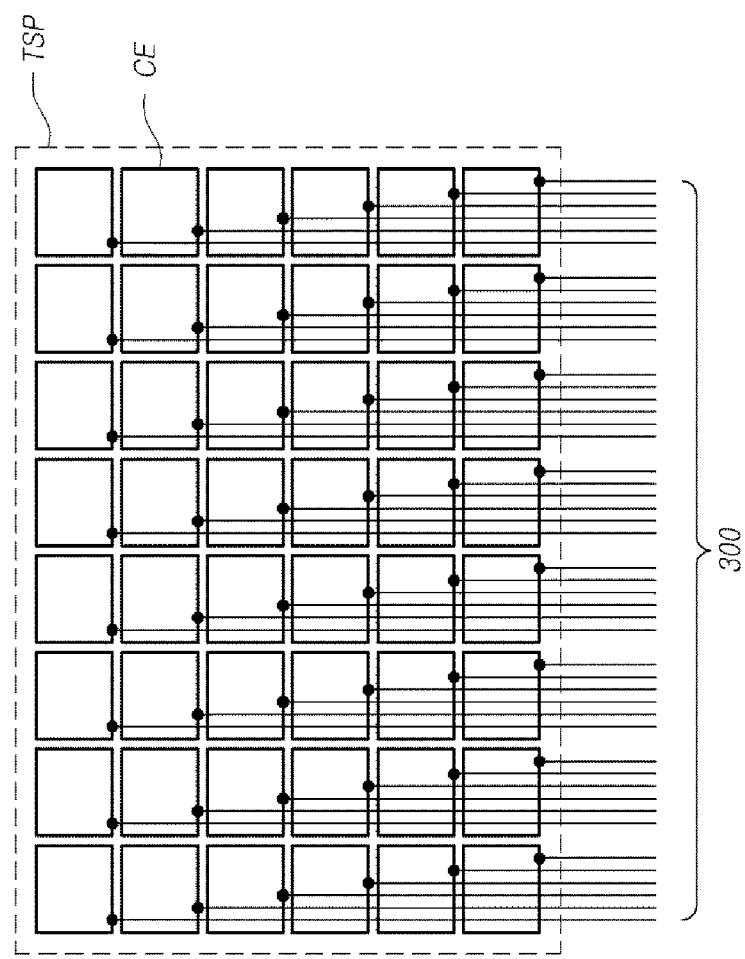
FIG. 3 illustrates a touch screen panel included in the display panel of the touch sensitive display device, according to exemplary embodiments of the present invention.

FIG. 2 schematically illustrates a touch system of the touch sensitive display device 100, according to exemplary embodiments of the present invention, and FIG. 3 illustrates a touch screen panel TSP included in the display panel 110 of the touch sensitive display device 100, according to exemplary embodiments of the present invention.

Referring to FIGS. 1 and 2, the touch sensitive display device 100, according to the exemplary embodiments of the present invention, includes a plurality of common electrodes CE that function as touch sensors (touch electrodes) and a touch circuit 190 that senses a touch by sequentially driving the plurality of common electrodes CE, as illustrated in FIG. 2, in order to provide a touch sensing function.

The touch circuit 190 performs a sensing operation by sequentially driving the plurality of common electrodes CE, thereby detecting whether a touch is made and calculating touch coordinates.

More specifically, the touch circuit 190 may calculate whether a touch is made, or may calculate touch coordinates, by sequentially selecting at least one of the plurality of common electrodes CE as a common electrode CEs subjected to sensing, providing a touch driving signal TDS to the selected common electrode CEs, receiving a touch sensing signal TSS from the corresponding common electrode CEs, and identifying a change in capacitance (or a change in a voltage or a change in an amount of charging) of each common electrode CE based on the touch sensing signal TSS received from the common electrode CE.

Referring to FIG. 2, the touch circuit 190 may include: for example, a micro control unit (MCU) 210 that controls the generation of a signal associated with a touch sensing operation and performs a process of detecting whether a touch is made and calculating touch coordinates; and a touch sensing signal detection circuit 220 that detects a touch sensing signal TSS and forwards the detected touch sensing signal to the MCU 210.

Referring to FIGS. 1 to 3, the plurality of common electrodes CE may be embedded in the display panel 110.

Namely, the display panel 110 of the display device 100, according to the exemplary embodiments of the present invention, may have the touch screen panel TSP therein.

The plurality of common electrodes CE included in the display panel 110 may operate as display electrodes to which a common voltage Vcom is applied in order to display an image, as well as may operate as the touch electrodes (touch sensors) as described above.

Meanwhile, one signal line 300 may be connected to each common electrode CE in order to provide touch driving signals to the plurality of common electrodes CE that may operate as the touch electrodes and to supply a common voltage Vcom to the plurality of common electrodes CE that may operate as the display electrodes.

Namely, one common electrode CE may be connected to the touch circuit 190 and a common voltage supply unit through one signal line 300.

The term "common" in the common electrodes, disclosed in this specification, means that the common electrodes CE are used as both the touch electrodes and the display electrodes. That is, the term "common" means that the common electrodes CE are used in both a touch mode and a display mode.

Each common electrode CE is the display electrode for a different respective block of display pixels. For a LCD display, voltage differences between the common electrode and pixel electrodes of the individual display pixels create electrical fields. The electric fields twist the LCD crystals and allow light to pass through the pixels.

Besides the meanings, the term "common" may also mean that a "common voltage Vcom" is applied to the plurality of common electrodes CE that operate as the display electrodes.

As described above, the touch sensitive display device 100, according to the exemplary embodiments of the present invention, may provide both the image display function and the touch sensing function. For example, the touch sensitive display device 100 may be a display, such as a TV, a monitor, etc., a computer, such as a notebook computer, etc., or a mobile device, such as a smart phone, a tablet PC, etc.

The touch sensitive display device 100, according to the exemplary embodiments of the present invention, may operate in a display mode for providing an image display function and in a touch mode for providing a touch sensing function.

Hereinafter, the operating modes of the touch sensitive display device 100, according to the exemplary embodiments of the present invention, will be described in detail.

Figure 4:
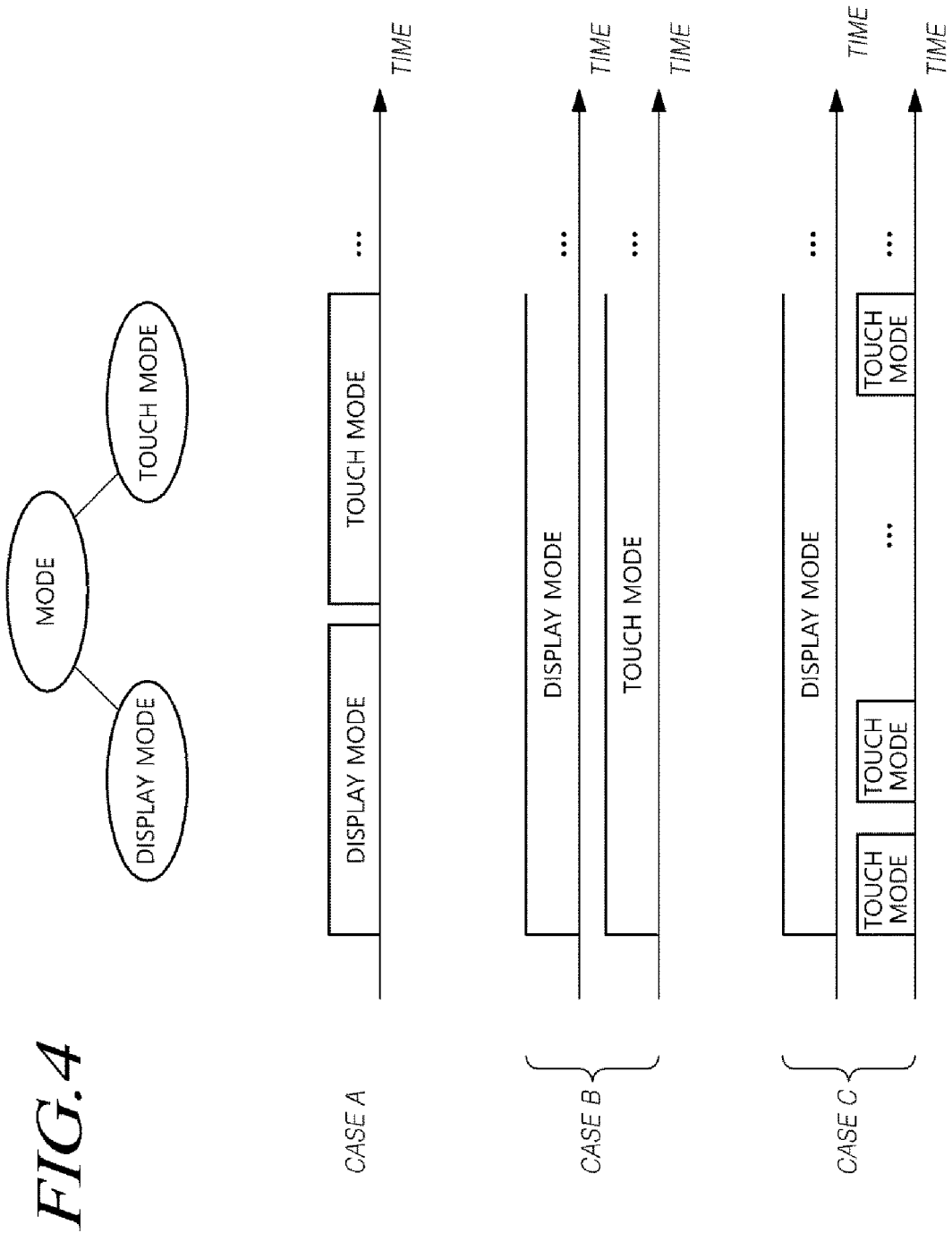
FIG. 4 illustrates operating modes of the touch sensitive display device, according to exemplary embodiments of the present invention.

FIG. 4 illustrates operating modes of the touch sensitive display device 100, according to exemplary embodiments of the present invention.

Referring to FIG. 4, the touch sensitive display device 100, according to the exemplary embodiments of the present invention, has two operating modes, including a display mode for providing an image display function and a touch mode for providing a touch sensing function.

Referring to FIG. 4, the touch sensitive display device 100, according to the exemplary embodiments of the present invention, may operate in the display mode or in the touch mode at one time point as in the case A.

In this case, the display mode and the touch mode may progress in a time-division manner, and a display mode period and a touch mode period are separated from each other in time.

Referring to FIG. 4, the touch sensitive display device 100, according to the exemplary embodiments of the present invention, may operate both in the display mode and in the touch mode at the same time point as in the cases B and C.

In this case, the display mode and the touch mode may progress independently, and the display mode period and the touch mode period may overlap each other in time.

Figure 5:
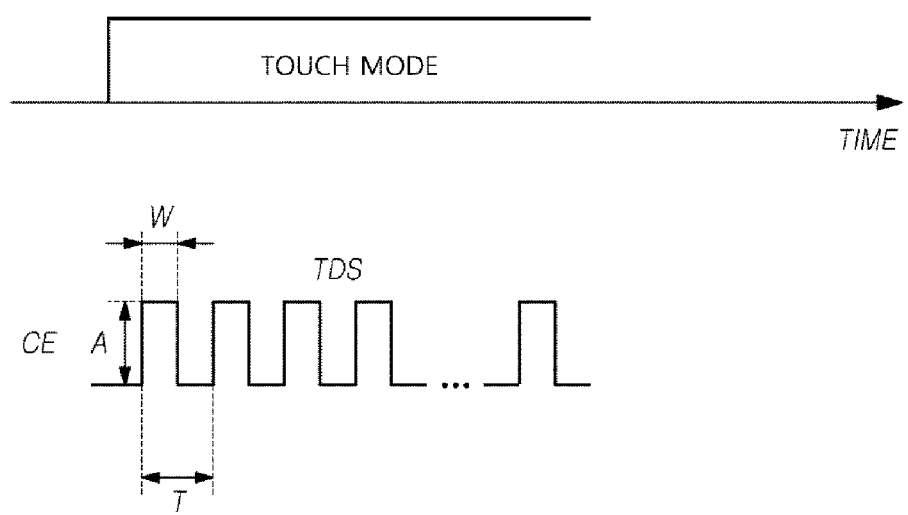
FIG. 5 illustrates a touch driving signal provided to a common electrode, which operates as a touch electrode, for a touch mode period of the touch sensitive display device, according to exemplary embodiments of the present invention.

FIG. 5 illustrates a touch driving signal TDS provided to a common electrode CE, which operates as a touch electrode, for a touch mode period of the touch sensitive display device 100, according to exemplary embodiments of the present invention.

Referring to FIG. 5, the touch driving signal TDS provided to the common electrode, which operates as a touch electrode, for the touch mode period which is separated from a display mode period in a time-division manner and during which the touch sensitive display device 100, according to the exemplary embodiments of the present invention, operates in the touch mode that is independent of the display mode may be a pulse width modulation (PWM) signal that has amplitude A of a predetermined voltage.

The signal waveform of the touch driving signal TDS may be defined by a cycle T and a pulse width W. In some cases, the touch driving signal TDS may also be defined by a duty cycle W/T and a pulse width W, or by a duty cycle W/T and a cycle T.

The touch circuit 190 may sequentially apply the aforementioned touch driving signal TDS to the plurality of common electrodes CE for at least one touch mode period to identify capacitance (or a voltage or an amount of charging) of each common electrode CE or a change thereof (or a change in the voltage or a change in the amount of charging) according to a touch location, thereby sensing a touch.

If unnecessary parasitic capacitance, in addition to capacitance between the common electrodes CE and a pointer (e.g., a finger, a pen, etc.), is formed for the duration of touch driving and touch sensing, capacitance that corresponds to the sum of the desired capacitance and the parasitic capacitance or a change thereof may be identified so that the accuracy of touch sensing may be degraded by the parasitic capacitance.

Accordingly, exemplary embodiments of the present invention may provide methods for preventing (removing) the parasitic capacitance that may deteriorate the accuracy of touch sensing, and detailed descriptions thereof will be given below.

Figure 6:
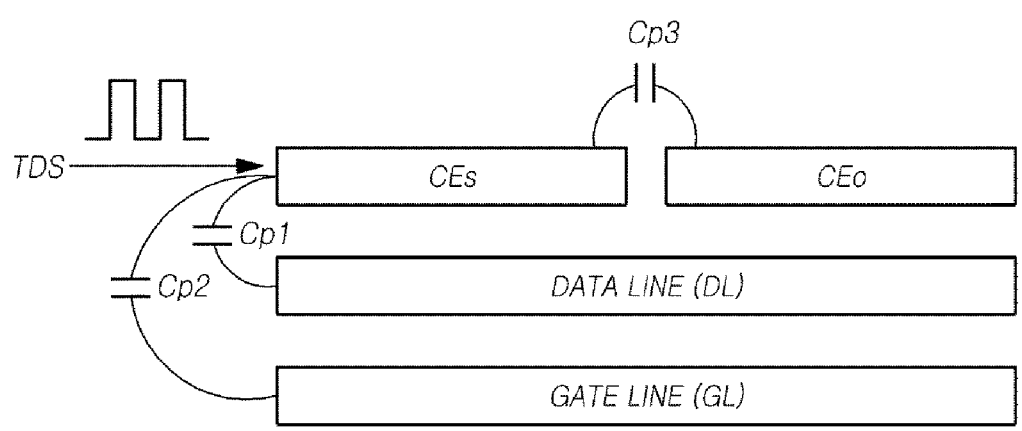
FIG. 6 illustrates parasitic capacitances that are generated in an active area for a touch mode period of the touch sensitive display device, according to exemplary embodiments of the present invention.

FIG. 6 illustrates parasitic capacitances Cp1, Cp2, and Cp3 that are generated in an active area (A/A) for a touch mode period of the touch sensitive display device 100, according to exemplary embodiments of the present invention.

Referring to FIG. 6, when a touch driving signal TDS is applied to a common electrode CEs, which operates as a touch electrode subjected to touch sensing, for the touch mode period, the parasitic capacitance Cp1 may be generated between the common electrode CEs subjected to the touch sensing, to which the touch driving signal TDS is applied, and a data line DL disposed on the display panel 110.

Further, the parasitic capacitance Cp2 may be generated between the common electrode CEs to which the touch driving signal TDS is applied and a gate line GL disposed on the display panel 110.

In addition, the parasitic capacitance Cp3 may also be generated between the common electrode CEs to which the touch driving signal TDS is applied and another common electrode (CEo) that is not subjected to sensing at the current time point.

In other words, in addition to capacitance between a pointer and the common electrode CEs that is generated for touch sensing, the unnecessary parasitic capacitances Cp1, Cp2, and Cp3 may be generated between the common electrode CEs subjected to sensing and other patterns (e.g., the data line DL, the gate line GL, and the other common electrode CEo) within the display panel 110 while touch driving is performed by applying the touch driving signal TDS to the common electrode CEs subjected to sensing.

The parasitic capacitances Cp1, Cp2, and Cp3 are the major causes of degradation in sensing accuracy in a capacitance-based touch sensing method.

Namely, the parasitic capacitances Cp1, Cp2, and Cp3, which are generated around the common electrode CEs subjected to sensing, may act as a "load" for the duration of touch driving and touch sensing and induce a noise component (namely, an error component) during the touch sensing, thereby degrading the accuracy of the sensing.

More specifically, the touch sensing signal detection circuit 220 may detect a touch sensing signal TSS, against which noise (error) is generated by the parasitic capacitances Cp1, Cp2, and Cp3 acting as a load, from the common electrode CEs subjected to sensing, and the micro control unit 210 may accordingly detect the presence or absence of an erroneous touch, or may calculate erroneous touch coordinates by using the touch sensing signal TSS against which the noise (error) is generated.

Accordingly, exemplary embodiments of the present invention may provide "load free driving (LFD)," which is a driving method that can prevent the unnecessary parasitic capacitances Cp1, Cp2, and Cp3 from being generated, thereby enhancing the accuracy of touch sensing.

The load free driving (LFD) may be defined as a driving method for removing a load that deteriorates the accuracy of touch sensing, and is an additional driving method accompanied by the main touch driving that provides the touch driving signal TDS to the common electrode CEs subjected to sensing.

Hereinafter, a load free driving (LFD) method for the touch sensitive display device 100, according to the exemplary embodiments of the present invention, will be described in more detail.

Figure 7:
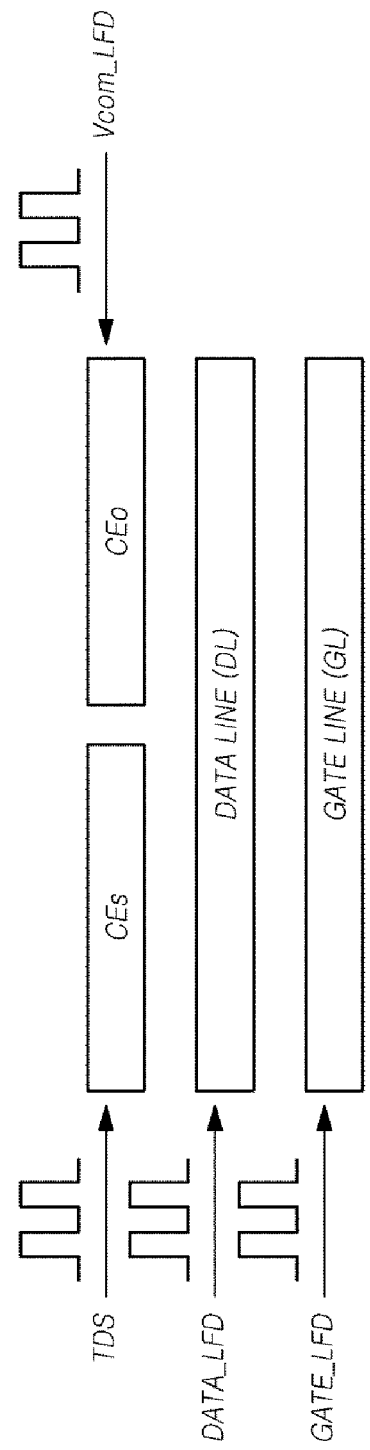
FIG. 7 illustrates load free driving for preventing the parasitic capacitances from being generated in the active area for the touch mode period of the touch sensitive display device, according to exemplary embodiments of the present invention.

FIG. 7 illustrates a load free driving (LFD) method for preventing the parasitic capacitances Cp1, Cp2, and Cp3 from being generated in the active area (A/A) of the display panel 110 for the touch mode period of the touch sensitive display device 100, according to exemplary embodiments of the present invention.

Referring to FIG. 7, the parasitic capacitances Cp1, Cp2, and Cp3 due to the data line DL, the gate line GL, and the other common electrode CEo may be prevented by a load free driving (LFD) method for applying signals (hereinafter, referred to as load free driving (LFD) signals) that have the same phase as the touch driving signal TDS to the data line DL, the gate line GL, and the other common electrode CEo for the touch mode period during which the touch driving signal TDS is applied to the common electrode CEs subjected to touch sensing.

The load free driving signal for preventing the parasitic capacitance Cp1 due to the data line DL is referred to as a data line load free driving signal DATA_LFD.

The load free driving signal for preventing the parasitic capacitance Cp2 due to the gate line GL is referred to as a gate line load free driving signal GATE_LFD.

The load free driving signal for preventing the parasitic capacitance Cp3 due to the other common electrode CEo is referred to as a common electrode load free driving signal Vcom_LFD.

The data load free driving signal DATA_LFD, the gate load free driving signal GATE_LFD, and the common electrode load free driving signal Vcom_LFD have the same phase as the touch driving signal TDS.

Further, the data load free driving signal DATA_LFD, the gate load free driving signal GATE_LFD, and the common electrode load free driving signal Vcom_LFD may have the same amplitude as the touch driving signal TDS.

That means that the differences between the low level voltages and the high level voltages of the respective signals are the same as each other.

In the case of the signals having the same amplitude, if the differences between the low level voltages and the high level voltages thereof are the same as each other, the low level voltages may be the same as, or different from, each other, and the high level voltages may also be the same as, or different from, each other.

Since the data load free driving signal DATA_LFD applied to the data line DL has the same amplitude and phase as the touch driving signal TDS applied to the common electrode CEs subjected to sensing, there is no potential difference between the data line DL and the common electrode CEs subjected to sensing so that the corresponding parasitic capacitance Cp1 can be prevented through the above-described load free driving.

Further, since the gate load free driving signal GATE_LFD applied to the gate line GL has the same amplitude and phase as the touch driving signal TDS applied to the common electrode CEs subjected to sensing, there is no potential difference between the gate line GL and the common electrode CEs subjected to sensing so that the corresponding parasitic capacitance Cp2 can be prevented.

In addition, since the common electrode load free driving signal Vcom_LFD applied to the common electrode CEo which is not subjected to sensing has the same amplitude and phase as the touch driving signal TDS applied to the common electrode CEs subjected to sensing, there is no potential difference between the common electrode CEo, which is not subjected to sensing, and the common electrode CEs subjected to sensing so that the corresponding parasitic capacitance Cp3 can be prevented.

Meanwhile, the parasitic capacitances Cp1, Cp2, and Cp3, described above with reference to FIG. 6, are generated in connection with the patterns DL, GL, and CEo disposed in the active area (A/A) that corresponds to an image display area of the display panel 110.

Meanwhile, the touch driving signal TDS and the touch sensing signal TSS passes through a non-active area (N/A) as well as the active area (A/A).

The "non-active area (N/A)" disclosed herein refers to all areas rather than the active area (A/A) and may include all areas (e.g., a printed circuit board, a film, etc.) through which a signal can pass, as well as an area where an image is not displayed on the display panel 110.

Since the touch driving signal TDS and the touch sensing signal TSS pass through the non-active area (N/A) as well as the active area (A/A) as described above, there is also a possibility that parasitic capacitance is generated in the non-active area (N/A).

A location where parasitic capacitance may be generated in the non-active area (N/A) may vary depending on the locations of signal transmission paths of the touch driving signal TDS and the touch sensing signal TSS and the locations of signal transmission paths of other voltage signals in the non-active area (N/A).

Namely, a location where parasitic capacitance may be generated in the non-active area (N/A) may vary depending on the locations of configurations that serve to transmit/receive and process the touch driving signal TDS, the touch sensing signal TSS, and the other voltage signals in the non-active area (N/A).

Accordingly, the locations of the configurations that serve to transmit/receive and process the touch driving signal TDS, the touch sensing signal TSS, and the other voltage signals in the non-active area (N/A) will be illustratively described with reference to FIGS. 8 and 9. Thereafter, load free driving for preventing parasitic capacitance from being generated in the non-active area (N/A) according to the illustrated locations will be described.

Figure 8:
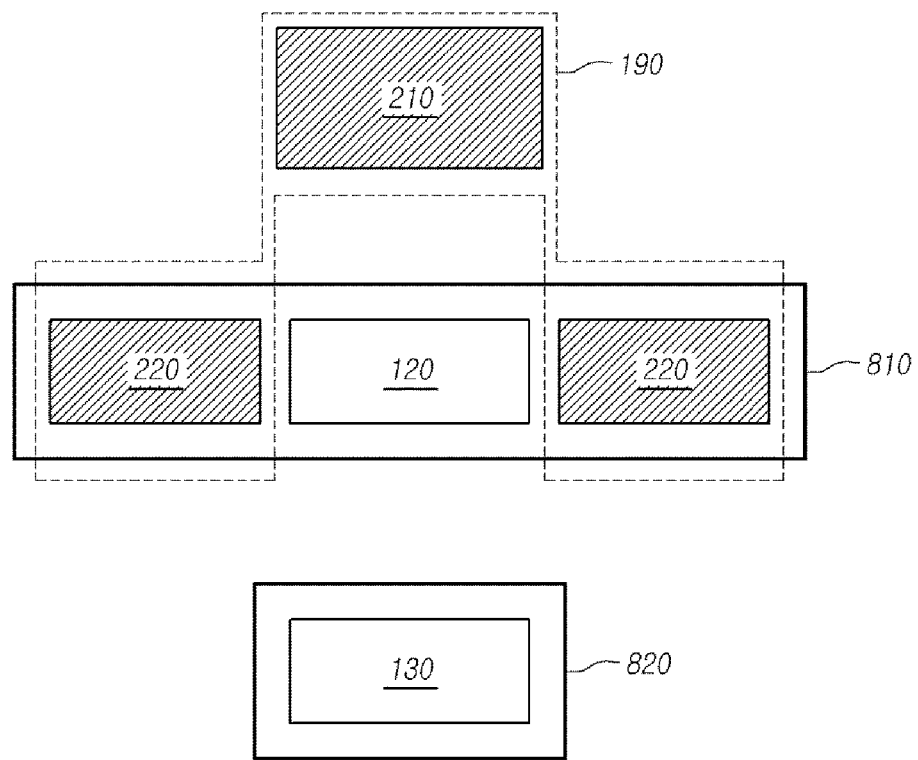
FIG. 8 illustrates an implemented embodiment of a touch circuit and a drive circuit of the touch sensitive display device according to the exemplary embodiments of the present invention.

FIG. 8 illustrates an implemented embodiment of the touch circuit 190 and drive circuits 810, 820 of the touch sensitive display device 100 according to the exemplary embodiments of the present invention.

The micro control unit 210 and the touch sensing signal detection circuit 220, which are included in the touch circuit 190, may be implemented as a single integrated circuit or separate integrated circuits.

Alternatively, the touch sensing signal detection circuit 220 may be included in the data drive circuit 120.

Further, as illustrated in FIG. 8, the touch sensing signal detection circuit 220 may be included, along with the data drive circuit 120, in the first drive circuit 810 that is implemented as an integrated circuit.

Accordingly, the first drive circuit 810 may perform both a data driving function and a part of a touch function.

Meanwhile, the micro control unit 210 included in the touch circuit 190 may be separately implemented as illustrated in FIG. 8, or may be included in another component, such as the first drive circuit 810, the data drive circuit 120, the timing controller 140, or the like.

The gate drive circuit 130 is also referred to as the second drive circuit 820 so as to be distinguished from the first drive circuit 810.

Figure 9:
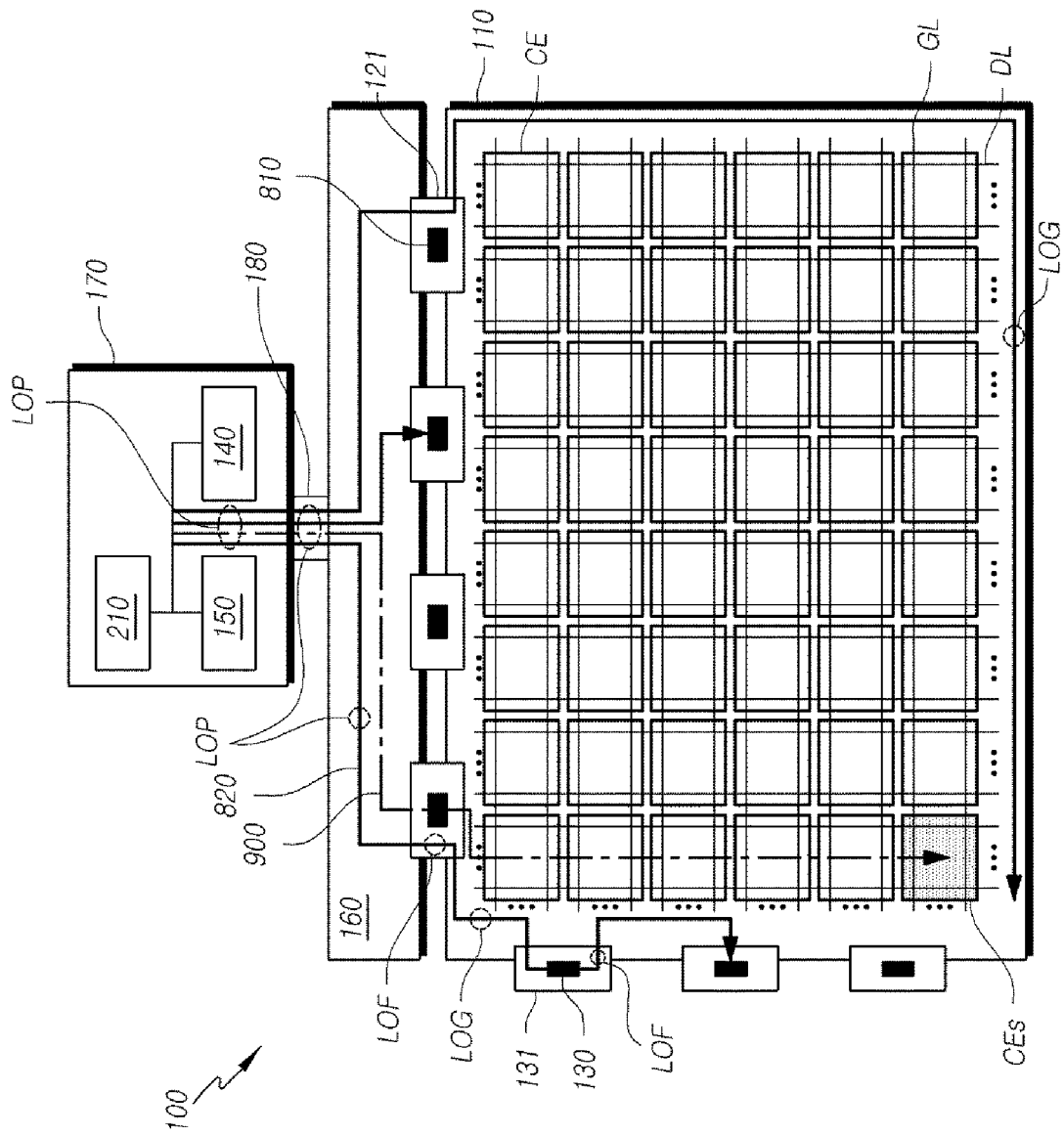
FIG. 9 is a diagram for explaining the system configuration of the touch sensitive display device according to the exemplary embodiments of the present invention and parasitic capacitance generated in a non-active area.

In cases where the first drive circuit 810 is implemented in the shape of a single integrated circuit chip that includes at least one data drive circuit 120 and at least one touch sensing signal detection circuit 220, and the micro control unit 210 is separately configured as illustrated in FIG. 8, the touch sensitive display device 100, according to the exemplary embodiments of the present invention, may be implemented as in a system configuration diagram of FIG. 9.

The location where parasitic capacitance is generated in the non-active area (N/A) according to the system configuration of FIG. 9 will be described below.

FIG. 9 is a diagram for explaining the system configuration of the touch sensitive display device 100 according to the exemplary embodiments of the present invention and parasitic capacitance generated in the non-active area (N/A).

Referring to FIG. 9, in cases where a common electrode CEs on a corner of the display panel 110 is currently subjected to touch driving and sensing, a touch driving signal TDS or a signal corresponding thereto is transmitted to the corresponding common electrode CEs via the control printed circuit board 170, the connecting member 180, the source printed circuit board 160, the film 121, and the first drive circuit 810 through the signal line 300 (not shown in FIG. 9) electrically connected to the first drive circuit 810.

Here, the signal line 300 is formed on a substrate of the display panel 110.

The aforementioned signal corresponding to the touch driving signal TDS may include, for example, a pulse modulated common electrode voltage Vcom_PWM that is a reference for the generation of the touch driving signal TDS and a modulated ground voltage GND_PWM that is a reference for the generation of the pulse modulated common electrode voltage Vcom_PWM.

After the touch driving signal TDS is transmitted to the corresponding common electrode CEs along the above-described transmission path 900, a touch sensing signal TSS is transmitted to the micro control unit 210 along the same path 900, whereby touch sensing is performed.

The touch driving and sensing path 900 may exist in the non-active area (N/A) that includes the control printed circuit board 170, the connecting member 180, the source printed circuit board 160, the film 121, and the peripheral area (bezel area) of the panel, as well as in the active area (A/A) where most of the sensing line 300 is disposed.

Therefore, as described above, parasitic capacitance acting as a load that deteriorates the accuracy of sensing may be generated in the non-active area (N/A) as well as in the active area (A/A).

In regard to the touch driving and sensing path 900 existing in the non-active area (N/A), the location where parasitic capacitance is generated in the non-active area (N/A) may include, for example, at least one of a line (Line On PCB (LOP), hereinafter, referred to as an "LOP line") that is disposed on the control printed circuit board 170, the connecting member 180, and the source printed circuit board 160, a line (Line On Film (LOF), hereinafter, referred to as an "LOF line") that is disposed on the films 121 and 131, and a line (Line On Glass (LOG), hereinafter, referred to as an "LOG line") that is disposed on the peripheral area of the panel.

Figure 10:
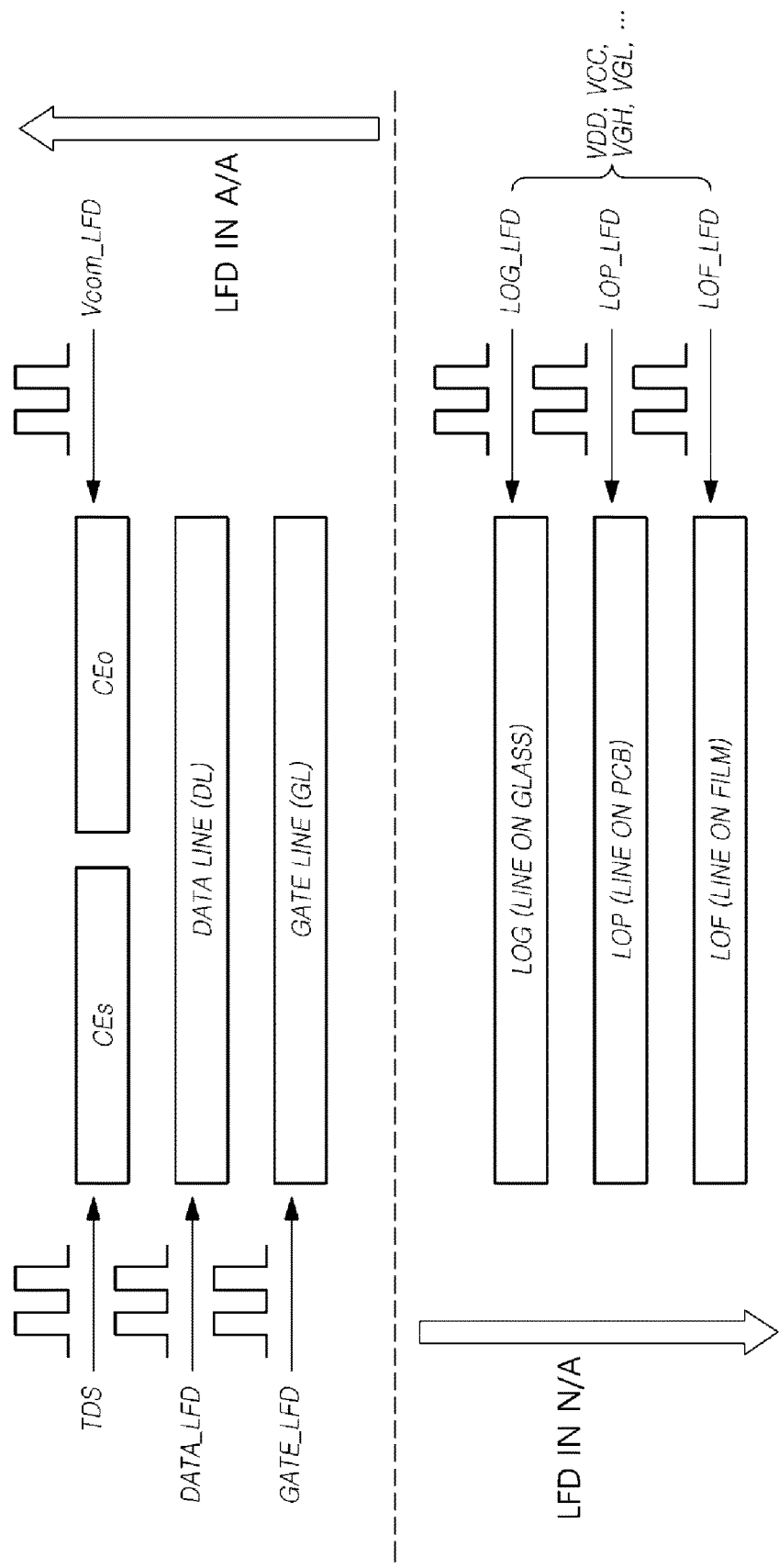
FIG. 10 illustrates load free driving for preventing parasitic capacitance from being generated in the active area (A/A) and load free driving for preventing parasitic capacitance from being generated in the non-active area (N/A) for a touch mode period of the touch sensitive display device, according to exemplary embodiments of the present invention.
Figure 11:
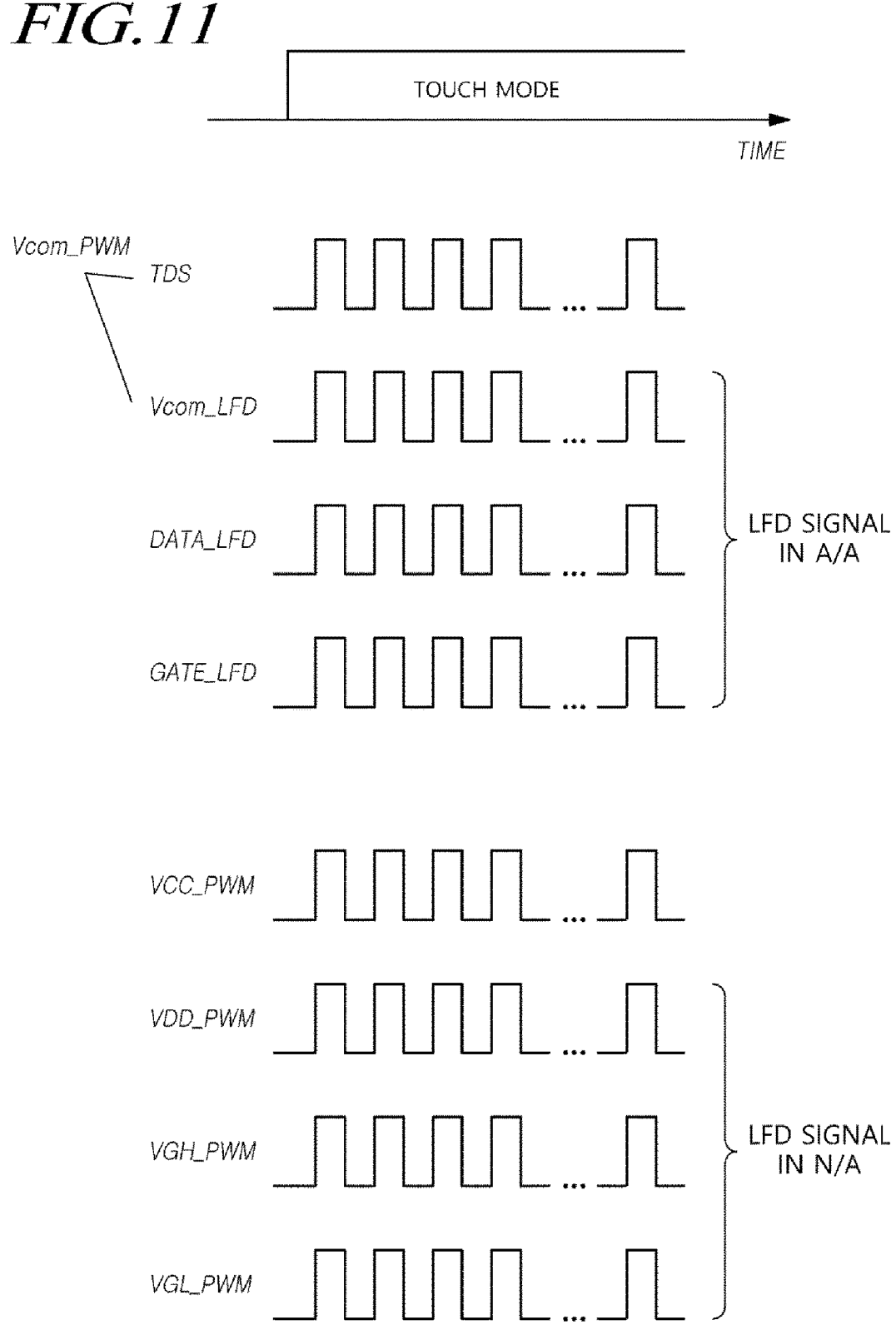
FIG. 11 illustrates a load free driving signal in the active area (LFD signal in A/A) and a load free driving signal in the non-active area (LFD signal in N/A) for the touch mode period of the touch sensitive display device, according to exemplary embodiments of the present invention.

FIG. 10 illustrates load free driving for preventing parasitic capacitance from being generated in the active area (A/A) and load free driving for preventing parasitic capacitance from being generated in the non-active area (N/A) for a touch mode period of the touch sensitive display device 100, according to exemplary embodiments of the present invention, and FIG. 11 illustrates a load free driving signal in the active area (A/A) (LFD signal in A/A) and a load free driving signal in the non-active area (N/A) (LFD signal in N/A) for the touch mode period of the touch sensitive display device 100, according to exemplary embodiments of the present invention.

Referring to FIGS. 10 and 11, the parasitic capacitance in the active area (A/A) may be removed, as described above with reference to FIG. 7, through the "load free driving in the active area (A/A) (LFD in A/A)" in which the load free driving signals DATA_LFD, GATE_LFD, and Vcom_LFD that have the same phase as the touch driving signal TDS are provided to the patterns DL, GL, and CEo, which are disposed in the active area (A/A), while the touch driving signal TDS is applied to the common electrode CEs subjected to sensing.

Here, the common electrode load free driving signal Vcom_LFD and the touch driving signal TDS are the same as the pulse modulated common electrode voltage Vcom_PWM, the pulse width of which is modulated based on a DC-type common voltage Vcom_DC, or are generated from the pulse modulated common electrode voltage Vcom_PWM.

The data load free driving signal DATA_LFD and the gate load free driving signal GATE_LFD may also be the same as the pulse modulated common electrode voltage Vcom_PWM, or may also be generated from the pulse modulated common electrode voltage Vcom_PWM.

Referring to FIGS. 10 and 11, parasitic capacitance in the non-active area (N/A) may also be removed through "load free driving in the non-active area (N/A) (LFD in N/A)" in which load free driving signals LOG_LFD, LOP_LFD, and LOF_LFD that have the same phase as the touch driving signal TDS are provided to lines (an LOG line, an LOP line, and an LOF line), which are disposed in the non-active area (N/A), while the touch driving signal TDS is applied to the common electrode CEs subjected to sensing.

Referring to FIGS. 10 and 11, the signals applied to the lines (the LOG line, the LOP line, and the LOF line), which are disposed in the non-active area (N/A), while the touch driving signal (TDS) is applied to the common electrode CEs subjected to sensing may include, for example, a first power voltage VCC, a second power voltage VDD, a gate high-level voltage VGH, a gate low-level voltage VGL, etc.

Here, the first power voltage VCC, the second power voltage VDD, the gate high-level voltage VGH, the gate low-level voltage VGL, and the like are "display voltages" used by the first and second drive circuits 810 and 820 for data driving and gate driving when an image display function is provided.

Although the display voltages are used when an image display function is provided for a display mode period and have no direct relation to touch driving and touch sensing for a touch mode period, the display voltages are DC-type voltages applied to the drive circuits 810, 820 and the display panel 110.

Accordingly, referring to FIG. 11, the load free driving signals LOG_LFD, LOP_LFD, and LOF_LFD applied to the lines (the LOG line, the LOP line, and the LOF line), which are disposed in the non-active area (N/A), through the load free driving in the non-active area (N/A) while the touch driving signal TDS is applied to the common electrode CEs subjected to sensing may be load free driving signals VCC_PWM, VDD_PWM, VGH_PWM, and VGL_PWM that are made to have the same phase as the touch driving signal TDS, which corresponds to a pulse width modulation signal, based on the display voltages, such as the first power voltage VCC, the second power voltage VDD, the gate high-level voltage VGH, the gate low-level voltage VGL, etc.

If the load free driving in the non-active area (N/A) is not provided, the display voltages, such as the first power voltage VCC, the second power voltage VDD, the gate high-level voltage VGH, the gate low-level voltage VGL, etc., are applied to the lines (the LOG line, the LOP line, and the LOF line), which are disposed in the non-active area (N/A), in the form of a DC voltage for a touch mode period.

When the DC-type display voltages are applied to the lines (the LOG line, the LOP line, and the LOF line), which are disposed in the non-active area (N/A), for the touch mode period as described above, parasitic capacitance can be generated in the non-active area (N/A).

For the touch mode period, the touch sensitive display device 100, according to the exemplary embodiments of the present invention, does not apply the DC-type display voltages (VCC, VDD, VGH, VGL, and the like). Instead, the touch sensitive display device 100 applies pulse modulated display supply voltages VCC_PWM, VDD_PWM, VGH_PWM, and VGL_PWM, as load free driving signals that have the same phase as the touch driving signal TDS, to the lines (the LOG line, the LOP line, and the LOF line) disposed in the non-active area (N/A), thereby preventing parasitic capacitance from being generated in the non-active area (N/A).

An overview of the load free driving signals in the active area (A/A) and the load free driving signals in the non-active area (N/A) will be given below with reference to FIG. 11.

The load free driving signals in the active area (A/A) (LFD Signal in A/A) include the common electrode load free driving signal Vcom_LFD, the data load free driving signal DATA_LFD, the gate load free driving signal GATE_LFD, and the like.

The load free driving signals in the active area (A/A) may have the same phase as the touch driving signal TDS and may have the same pulse width and amplitude as the touch driving signal TDS.

The load free driving signals in the non-active area (N/A) (LFD Signal in N/A) may include the pulse modulated display supply voltages, such as the first pulse modulated power supply voltage VCC_PWM, the second pulse modulated power supply voltage VDD_PWM, the pulse modulated gate high-level supply voltage VGH_PWM, the pulse modulated gate low-level supply voltage VGL_PWM, and the like.

Among the pulse modulated display supply voltages, the first pulse modulated power supply voltage VCC_PWM and the second pulse modulated power supply voltage VDD_PWM are the first pulse modulated display supply voltages that may be applied to the lines (LOP, LOF, etc.) of the non-active area (N/A) and supplied to the first drive circuit 810.

Among the pulse modulated display supply voltages, the pulse modulated gate high-level supply voltage VGH_PWM and the pulse modulated gate low-level supply voltage VGL_PWM are the second pulse modulated display supply voltages that may be applied to the lines (LOP, LOF, LOG, etc.) of the non-active area (N/A) and supplied to the second drive circuit 820.

The pulse modulated display supply voltages, such as the first pulse modulated power supply voltage VCC_PWM, the second pulse modulated power supply voltage VDD_PWM, the pulse modulated gate high-level supply voltage VGH_PWM, the pulse modulated gate low-level supply voltage VGL_PWM, and the like, may have the same phase as the touch driving signal TDS and may have the same pulse width and amplitude as the touch driving signal TDS.

Meanwhile, for the display mode period, the first drive circuit 810 may supply the DC-type common electrode voltage Vcom_DC to all the common electrodes CE, or may supply the pulse modulated common electrode voltage Vcom_PWM of a pulse width modulation signal type to all the common electrodes CE.

More specifically, in cases where the display mode and the touch mode progress in a time-division manner as in the case A of FIG. 4, the first drive circuit 810 supplies the DC-type common electrode voltage signal Vcom_DC to all the common electrodes CE for the display mode period.

In cases where the display mode and the touch mode progress in parallel to overlap each other in time as in the case B or C of FIG. 4, the first drive circuit 810 may supply the pulse modulated common electrode voltage Vcom_PWM of a pulse width modulation signal type to all the common electrodes CE for the display mode period.

In this case, at one time point, one common electrode CEs among the plurality of common electrodes CE simultaneously operates as a display electrode for the display mode and as a touch electrode for the touch mode, and the remaining common electrodes CEo operate as display electrodes for the display mode.

Accordingly, at the time point, the common electrode CEs is subjected to touch driving and touch sensing, and the remaining common electrodes CEo are subjected to load free driving.

Therefore, the pulse modulated common electrode voltage Vcom_PWM is applied to all the common electrodes CE.

Meanwhile, for the display mode period that simultaneously progresses together with the touch mode period, a data voltage signal for displaying an image may also be applied to the data lines as a modulated data voltage signal of a pulse width modulation signal type.

Here, the modulated data voltage signal of a pulse width modulation signal type for displaying an image may function as a data load free driving signal in the touch mode period.

According to the above description, the display mode and the touch mode may progress in a time-division manner, independently, or in parallel.

Particularly, for the display mode period, even though the pulse modulated common electrode voltage Vcom_PWM of a pulse width modulation signal type is applied to all the common electrodes CE, the data voltage for displaying an image is also applied to the data lines as a pulse modulated data voltage signal of a pulse width modulation signal type so that the display mode and the touch mode can simultaneously operate as in the case B or C.

Therefore, the common electrode structure, in which the common electrodes CE function as both the touch electrodes and the display electrodes, makes it possible to overcome a limit to simultaneously progressing the touch mode and the display mode, thereby preventing degradation in the performance of image display and touch sensing, which is caused by the progress of the touch mode and the display mode in a time-division manner, and efficiently providing the image display function and the touch sensing function.

Hereinafter, a method of efficiently providing full load free driving (Full LFD), which includes the load free driving in the active area (A/A) and the load free driving in the non-active area (N/A), by the touch sensitive display device 100 according to the exemplary embodiments of the present invention, and a touch system for the same will be described in more detail.

Figure 12:
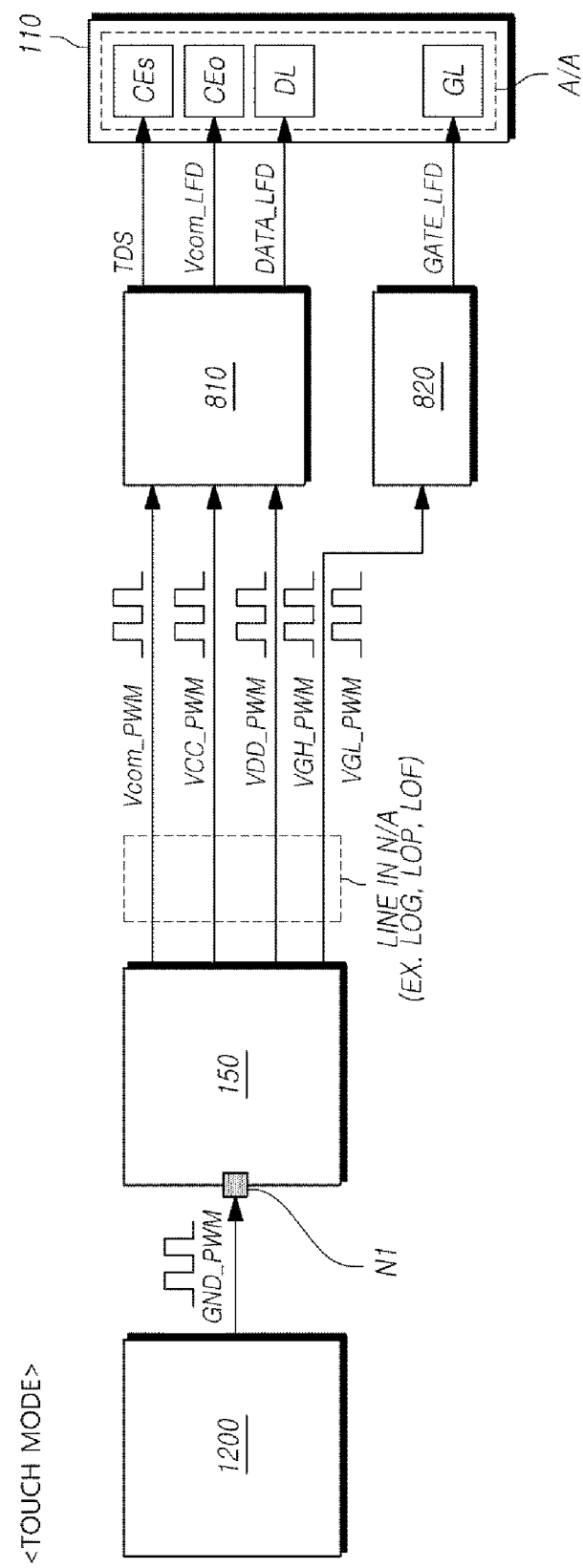
FIG. 12 illustrates a touch system that can perform full load free driving (Full LFD) in the touch sensitive display device, according to an exemplary embodiment of the present invention.
Figure 13:
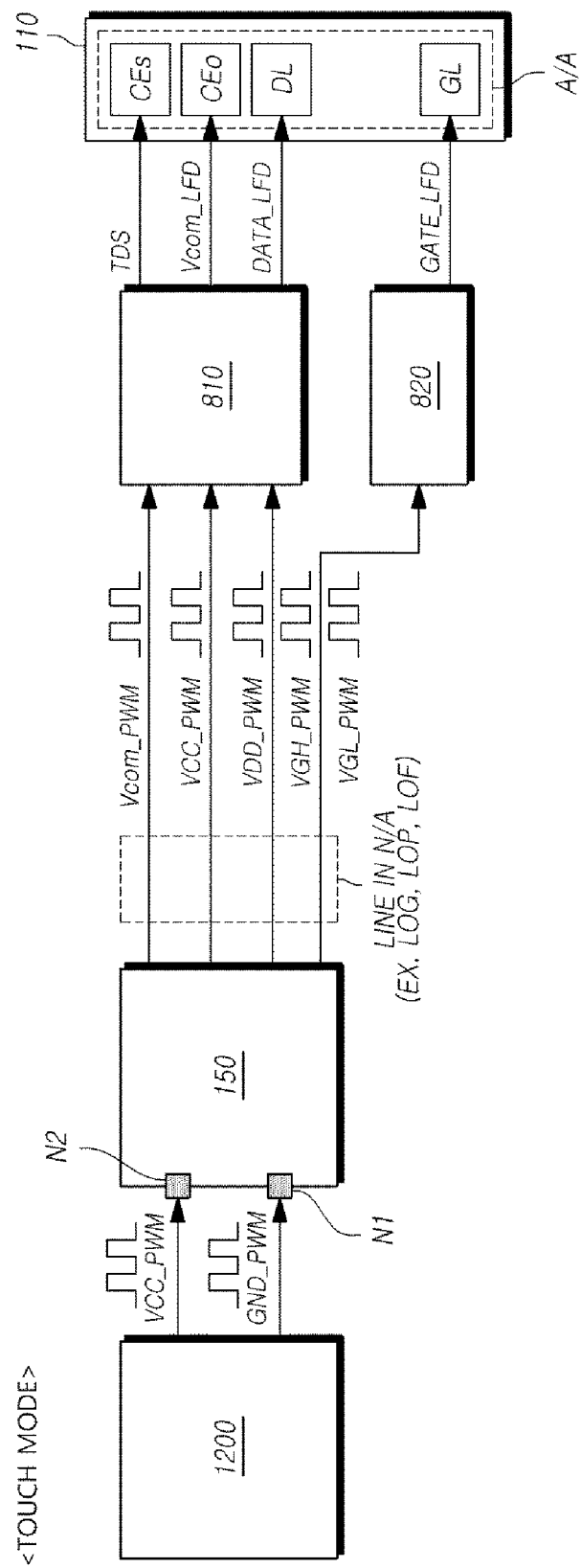
FIG. 13 illustrates a touch system that can perform full load free driving (Full LFD) in the touch sensitive display device, according to another exemplary embodiment of the present invention.

FIG. 12 illustrates a touch system that can perform full load free driving (Full LFD) in the touch sensitive display device 100, according to an exemplary embodiment of the present invention, and FIG. 13 illustrates a touch system that can perform full load free driving (Full LFD) in the touch sensitive display device 100, according to another exemplary embodiment of the present invention.

Referring to FIGS. 12 and 13, the touch systems of the touch sensitive display device 100, according to the exemplary embodiments of the present invention, may include a plurality of common electrodes CE that are disposed on the display panel 110 and used in both touch driving and display driving, a power control circuit 150 that generates signals associated with the touch driving and load free driving, a first drive circuit 810 that receives the generated signals from the power control circuit 150 and executes the touch driving and the load free driving, and a second drive circuit 820 that receives the generated signals from the power control circuit 150 and executes the load free driving.

Referring to FIGS. 12 and 13, the touch systems of the touch sensitive display device 100, according to the exemplary embodiments of the present invention, may further include a signal control circuit 1200 that generates a pulse modulated ground voltage GND_PWM and outputs the generated pulse modulated ground voltage GND_PWM to the power control circuit 150 across ground wiring (not shown).

Referring to FIGS. 12 and 13, the power control circuit 150 receives the "pulse modulated ground voltage GND_PWM", which corresponds to a pulse width modulation signal, through a ground voltage input terminal N1 thereof for a touch mode period.

The power control circuit 150 generates a pulse modulated common electrode voltage Vcom_PWM, the pulse width of which is modulated based on a DC-type common electrode voltage Vcom_DC, according to the input pulse modulated ground voltage GND_PWM.

Further, the power control circuit 150 generates pulse modulated display supply voltages (e.g., VCC_PWM, VDD_PWM, VGH_PWM, and VGL_PWM), the pulse widths of which are modulated based on DC-type display voltage signals (e.g., VCC_DC, VDD_DC, VGH_DC, and VGL_DC), according to the input pulse modulated ground voltage GND_PWM.

The power control circuit 150 outputs the pulse modulated common electrode voltage Vcom_PWM and the corresponding pulse modulated display supply voltages (e.g., VCC_PWM, VDD_PWM, VGH_PWM, and VGL_PWM), which are generated using the input pulse modulated ground voltage GND_PWM.

Referring to FIGS. 12 and 13, in the touch mode period, the first drive circuit 810 may receive first pulse modulated display supply voltages (e.g., VCC_PWM and VDD_PWM) among the pulse modulated display supply voltages (e.g., VCC_PWM, VDD_PWM, VGH_PWM, and VGL_PWM) and the pulse modulated common electrode supply voltage Vcom_PWM through lines (e.g., an LOP line, an LOF line, etc.) disposed in a non-active area, and may sequentially provide, to the plurality of common electrodes CE, a touch driving signal TDS that is the same as or corresponds to the pulse modulated common electrode voltage Vcom_PWM.

Here, when the touch driving signal TDS is the same as the pulse modulated common electrode voltage Vcom_PWM, that may mean that the signal characteristics thereof, such as amplitudes, phases, etc., are the same as each other.

Further, when the touch driving signal TDS corresponds to the pulse modulated common electrode voltage Vcom_PWM, that may mean that the signal characteristic of at least one of the amplitude, the pulse width, the cycle, and the phase of the touch driving signal TDS may differ from that of the pulse modulated common electrode voltage Vcom_PWM for efficiency of touch driving and touch sensing.

Referring to FIGS. 12 and 13, in the touch mode period, the second drive circuit 820 receives second pulse modulated display supply voltages (e.g., VGH_PWM and VGL_PWM) among the pulse modulated display supply voltages (e.g., VCC_PWM, VDD_PWM, VGH_PWM, and VGL_PWM) through lines (e.g., an LOP line, an LOF line, an LOG line, etc.) disposed in the non-active area.

As described above, for the touch mode period, the ground voltage, which is a reference for all the power used in the touch sensitive display device 100, is converted to the modulated ground voltage GND_PWM of a pulse width modulation signal type. The pulse modulated ground voltage GND_PWM is input to the power control circuit 150, so that the power control circuit 150 can convert a DC voltage in the touch mode period to pulse width modulation signal form and to output the same.

Therefore, the touch sensitive display device 100, according to the exemplary embodiments of the present invention, can provide full load free driving in an easy and efficient manner.

More specifically, the power control circuit 150 may modulate the DC-type common electrode voltage Vcom_DC according to the modulated ground voltage GND_PWM to generate and output the pulse modulated common electrode voltage Vcom_PWM of a pulse width modulation signal type.

Here, the pulse modulated common electrode voltage Vcom_PWM is required by the first drive circuit 810 to execute touch driving and load free driving in the active area (A/A).

Namely, the pulse modulated common electrode voltage Vcom_PWM is the same as, or corresponds to, the touch driving signal TDS and load free driving signals Vcom_LFD and DATA_LFD in the active area (A/A).

Further, the power control circuit 150 may modulate the DC-type display voltages VCC_DC, VDD_DC, VGH_DC, and VGL_DC according to the modulated ground voltage GND_PWM to generate and output the modulated display supply voltages VCC_PWM, VDD_PWM, VGH_PWM and VGL_PWM of a pulse width modulation signal type.

Accordingly, the modulated display supply voltages VCC_PWM, VDD_PWM, VGH_PWM and VGL_PWM, which are the same as or correspond to the touch driving signal TDS, may be applied to the lines (the LOP line, the LOF line, and the LOG line) in the non-active area (N/A). Accordingly, load free driving is performed in the non-active area (N/A).

The pulse modulated common electrode voltage Vcom_PWM, the modulated display supply voltages VCC_PWM, VDD_PWM, VGH_PWM, and VGL_PWM, and the touch driving signal TDS may be pulse width modulation signals that have the same phase as the modulated ground voltage GND_PWM.

As described above, all the signals in the active area (A/A) and in the non-active area (N/A) have the same phase as the modulated ground voltage GND_PWM for the touch mode period so that it is possible to efficiently provides full load free driving (Full LFD).

Meanwhile, the pulse modulated common electrode voltage Vcom_PWM, the modulated display supply voltages VCC_PWM, VDD_PWM, VGH_PWM, and VGL_PWM, and the touch driving signal TDS may be pulse width modulation signals that have a pulse width and an amplitude (e.g. peak to peak amplitude) that are substantially the same as or correspond to those of the modulated ground voltage GND_PWM. In this case, the pulse modulated common electrode voltage Vcom_PWM, the modulated display supply voltages VCC_PWM, VDD_PWM, VGH_PWM, and VGL_PWM, and the touch driving signal TDS may have substantially the same or a different phase from the modulated ground voltage GND_PWM. In one embodiment, two signals have the same phase if the respective pulses of the two signals have time aligned rising and falling edges.

In this regard, although the signals GND_PWM, TDS, Vcom-PWM, VCC_PWM, VDD_PWM, VGH_PWM, and VGL_PWM, which are generated for the touch mode period, must ideally have the same phase in order to reduce parasitic capacitance, the phases of the respective signals may be changed depending on the location of the panel, the characteristics of the drive circuits, the transmission paths, etc. Considering this, a slight phase difference may be intentionally made therebetween, which makes it possible to effectively reduce parasitic capacitance.

Namely, although all the signals in the active area (A/A) and in the non-active area (N/A) have an amplitude and a pulse width that are the same as or correspond to those of the modulated ground voltage GND_PWM for the touch mode period, a phase deviation may be intentionally made in consideration of a delay deviation of each signal, which makes it possible to more accurately provide full load free driving.

In performing touch sensing by sequentially driving the plurality of common electrodes CE for the touch mode period, the above-described first drive circuit 810, when providing the touch driving signal TDS, which is the same as or corresponds to the pulse modulated common electrode voltage Vcom_PWM, to a common electrode CEs subjected to the touch sensing, may provide the common electrode load free driving signal Vcom_LFD, which is the same as or corresponds to the modulated common electrode voltage Vcom_PWM, to another common electrode CEo that is not subjected to the touch sensing.

In performing the touch sensing by sequentially driving the plurality of common electrodes CE for the touch mode period, the first drive circuit 810 may provide, to at least one data line DL, the data line load free driving signal DATA_LFD, which is the same as or corresponds to the modulated common electrode voltage Vcom_LFD, when providing the touch driving signal TDS, which is the same as or corresponds to the modulated common electrode voltage Vcom_PWM, to the common electrode CEs subjected to the touch sensing.

Further, when the first drive circuit 810 provides the touch driving signal TDS, which is the same as or corresponds to the modulated common electrode voltage Vcom_PWM, to the common electrode CEs subjected to the touch sensing, the second drive circuit 820 may provide, to at least one gate line GL, a gate line load free driving signal GATE_LFD that is the same as or corresponds to the modulated common electrode voltage Vcom_LFD.

As described above, the common electrode load free driving signal Vcom_LFD, the data line load free driving signal DATA_LFD, and the gate line load free driving signal GATE_LFD, the pulse widths of which are modulated according to the modulated ground voltage GND_PWM that is a reference for the touch driving signal TDS, are applied to the common electrode CEo, the data line DL, and the gate line GL, respectively, which are disposed in the active area (A/A) so that it is possible to provide load free driving in the active area (A/A), thereby preventing parasitic capacitance from being generated in the active area (A/A). The common electrode load free driving signal Vcom_LFD, the data line load free driving signal DATA_LFD, and the gate line load free driving signal GATE_LFD have substantially same phase and amplitude as the modulated ground voltage GND_PWM and touch driving signal TDS.

Meanwhile, the above-described first modulated display supply voltages (e.g., VCC_PWM and VDD_PWM) may be transmitted from the power control circuit 150 to the first drive circuit 810 through the signal lines (e.g., the LOP line, the LOF line, etc.) in the non-active area (N/A).

Further, the second modulated display supply voltages (e.g., VGH_PWM and VGL_PWM) may be transmitted from the power control circuit 150 to the second drive circuit 820 through the signal lines (e.g., the LOP line, the LOF line, the LOG line, etc.) in the non-active area (N/A).

As described above, for the touch mode period, the DC-type display voltages (e.g., VCC_DC, VDD_DC, VGH_DC, and VGL_DC) are not transmitted through the signal lines (e.g., the LOP line, the LOF line, the LOG line, etc.) in the non-active area (N/A), and the modulated display supply voltages (e.g., VCC_PWM, VDD_PWM, VGH_PWM, and VGL_PWM), the pulse widths of which are modulated according to the modulated ground voltage GND_PWM that is a reference for generating the touch driving signal TDS, are transmitted through the signal lines (e.g., the LOP line, the LOF line, the LOG line, etc.) in the non-active area (N/A) so that it is possible to provide load free driving in the non-active area (N/A) while the touch driving and the touch sensing are performed, thereby preventing parasitic capacitance from being generated in the non-active area (N/A).

As illustrated in FIG. 13, the power control circuit 150 may also receive a first modulated power supply voltage VCC_PWM, which is a pulse width modulation signal, from the signal control circuit 1200 through a first power voltage input terminal N2 thereof at the same time as receiving the modulated ground voltage GND_PWM, which is a pulse width modulation signal, through the ground voltage input terminal N1 thereof.

Meanwhile, the signal control circuit 1200 illustrated in FIGS. 12 and 13 may be included in the first drive circuit 810 or the timing controller 140. In some cases, the signal control circuit 1200 may also be mounted on a separate printed circuit board that differs from the source printed circuit board 160 and the control printed circuit board 170.

Meanwhile, FIGS. 12 and 13 may selectively represent only the signal system of the touch system in the touch mode period in cases where the display mode and the touch mode progress in a time-division manner, or may represent the signal system of the touch system in the touch mode period that may overlap with the display mode period in cases where the display mode and the touch mode progress independently and in parallel.

Figure 14:
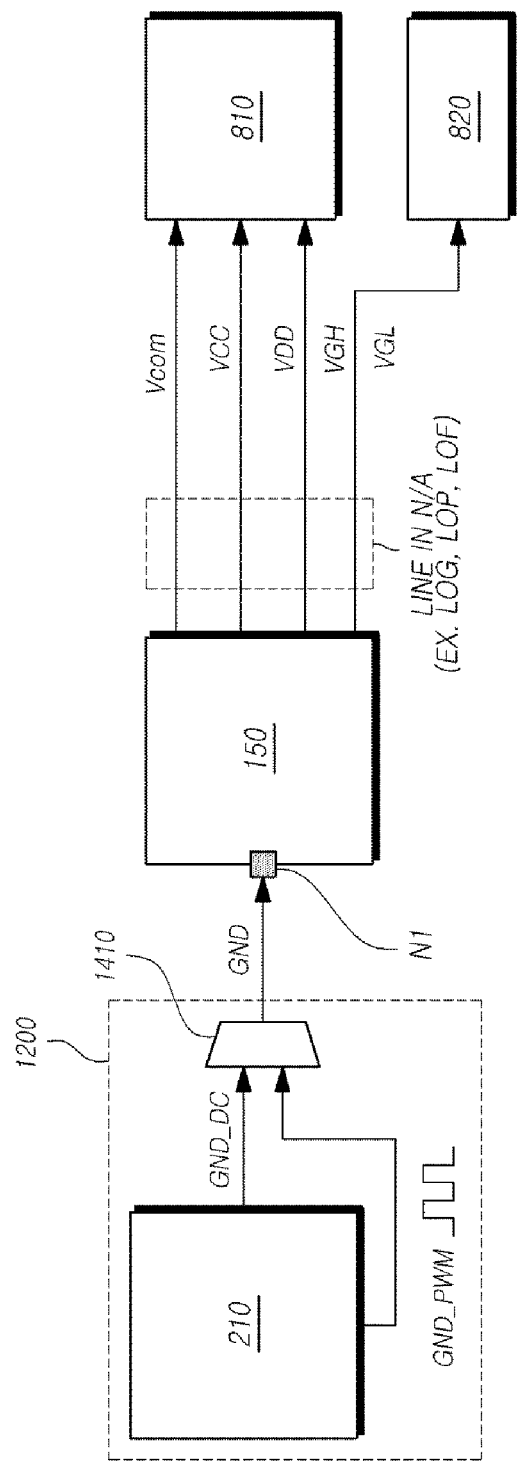
FIG. 14 illustrates a touch system that can perform full load free driving (Full LFD) in the touch sensitive display device, according to yet another exemplary embodiment of the present invention.
Figure 15:
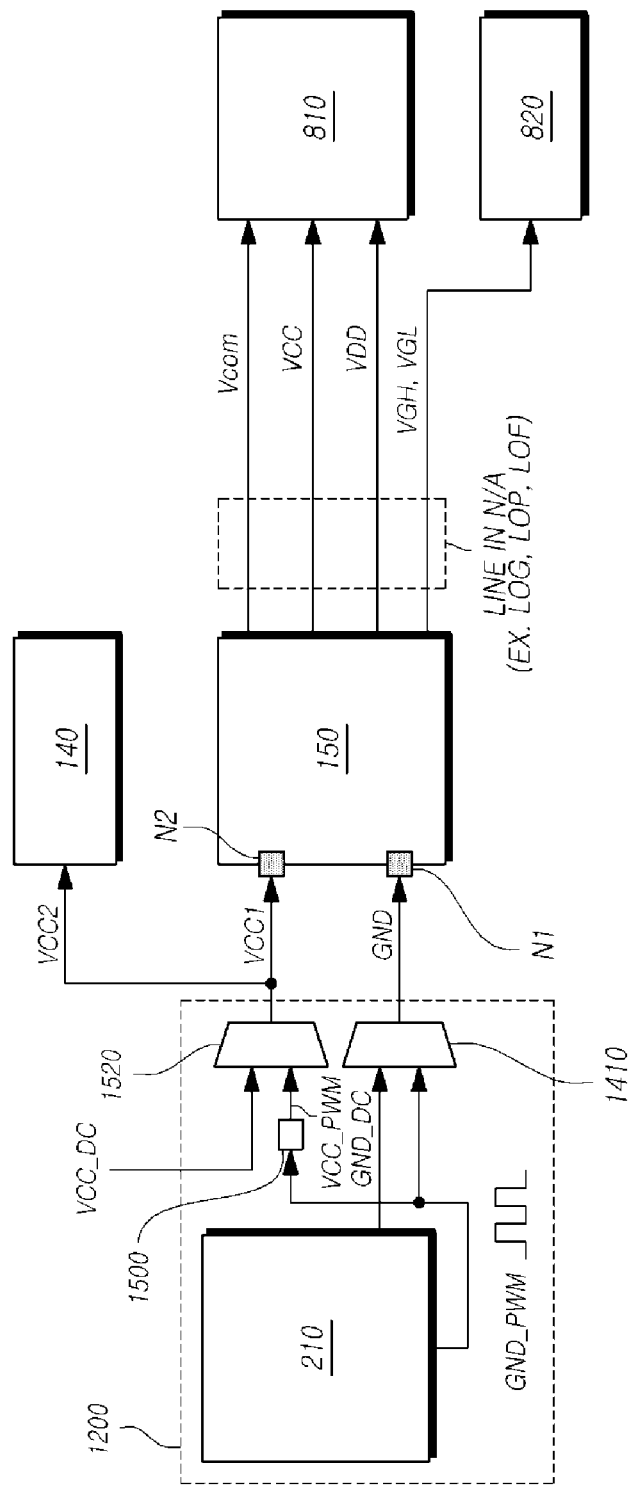
FIG. 15 illustrates a touch system that can perform full load free driving (Full LFD) in the touch sensitive display device, according to yet another exemplary embodiment of the present invention.

FIGS. 14 and 15 illustrate touch systems that can perform full load free driving (Full LFD) in the touch sensitive display device 100, according to other exemplary embodiments of the present invention.

FIGS. 14 and 15 illustrate signal systems of the touch systems that may be applied to both a case in which a display mode and a touch mode progress independently and in parallel and a case in which a display mode and a touch mode progress in a time-division manner.

Referring to FIGS. 14 and 15, a signal control circuit 1200 may generate a modulated ground voltage GND_PWM through pulse modulation.

Here, the pulse modulation may be, for example, a pulse width modulation.

For example, the signal control circuit 1200 may generate a ground pulse voltage GND_PWM that has a predetermined pulse width, a predetermined cycle, a predetermined duty cycle, or the like, and may output the generated modulated ground voltage GND_PWM to a power control circuit 150.

According to the above description, the signal control circuit 1200 may efficiently generate the modulated ground voltage GND_PWM that is a reference for generating a touch driving signal TDS of a pulse width modulation signal type and various load free driving signals (e.g., Vcom_LFD, DATA_LFD, GATE_LFD, VCC_PWM, VDD_PWM, VGH_PWM, VGL_PWM, etc.) that are used in the touch sensitive display device 100.

Meanwhile, the signal control circuit 1200 may also adjust the level of the modulated ground voltage GND_PWM (the voltage level of the amplitude) to output the modulated ground voltage GND_PWM to the power control circuit 150.

For example, the signal control circuit 1200 may amplify the first generated modulated ground voltage GND_PWM integer times, such as one, two, three times or more, or real-number times, such as 1.5 times, etc., to output the modulated ground voltage GND_PWM. In some cases, the signal control circuit 1200 may also change the amplitude of the first generated modulated ground voltage GND_PWM so as to be smaller (such as 0.7 times the size, etc.) in order to output the modulated ground voltage GND_PWM.

According to the above description, the modulated ground voltage GND_PWM may be generated differently in consideration of the performance and efficiency of touch driving and load free driving.

Referring to FIGS. 14 and 15, the signal control circuit 1200 may include, for example, a micro control unit circuit 210 that performs a main signal control function and a first multiplexer 1410 that performs a signal selection function.

The micro control unit 210 may output a DC-type ground voltage GND_DC and the modulated ground voltage GND_PWM.

Further, the first multiplexer 1410 may receive the ground voltage GND_DC and the modulated ground voltage GND_PWM, and may select the modulated ground voltage GND_PWM to output the same to a ground voltage input terminal N1 of the power control circuit 150 for a touch mode period (a period that is separated from a display mode period in time, or a period that overlaps with the display mode period in time).

For example, the first multiplexer 1410 may also select the ground voltage GND_DC to output the same to the ground voltage input terminal N1 of the power control circuit 150 for the display mode period (a period that is separated from the touch mode period in a time-division manner).

As described above, the ground signal GND input to the ground voltage input terminal N1 of the power control circuit 150 may be the DC-type ground voltage GND_DC or the modulated ground voltage GND_PWM of a pulse width modulation signal type as.

As described above, the signal control circuit 1200 may easily and efficiently generate the modulated ground voltage GND_PWM of a pulse width modulation signal type that swings above and below the DC-type ground voltage GND_DC, by using a pulse width modulation signal generation function of the micro control unit 210 and a signal selection function of the first multiplexer 1410, and may transmit the modulated ground voltage GND_PWM to the ground voltage input terminal N1 of the power control circuit 150.

Further, the signal control circuit 1200 may easily control touch related signals, by controlling (changing, adjusting, etc.) the modulated ground voltage GND_PWM through a pulse width modulation control of the micro control unit 210.

Referring to FIG. 15, the signal control circuit 1200 may further include a voltage controller 1500 (ex. Level shifter etc.) and a second multiplexer 1520. The voltage controller 1500 controls a low level voltage of the modulated ground voltage GND_PWM and outputs the modulated ground voltage GND PWM with the controlled low level voltage (ex. VCC DC) as a first modulated power supply voltage VCC_PWM. The second multiplexer 1520 receives a first DC-type power voltage VCC_DC and the first modulated power supply voltage VCC_PWM and selects the first modulated power supply voltage VCC_PWM to output the same to a first power voltage input terminal N2 of the power control circuit 150 for the touch mode period (a period that is separated from the display mode period in time, or a period that overlaps with the display mode period in time).

The second multiplexer 1520 may also select the first DC-type power voltage VCC_DC to output the same to the first power voltage input terminal N2 of the power control circuit 150 for the display mode period (a period that is separated from the touch mode period in a time-division manner).

The first power signal VCC1 input to the first power voltage input terminal N2 of the power control circuit 150 may be the first DC-type power voltage VCC_DC or the first modulated power supply voltage VCC_PWM.

As described above, the signal control circuit 1200 may easily and efficiently generate the first modulated power supply voltage VCC_PWM of a pulse width modulation signal type to which the first DC-type power voltage VCC_DC is swung, by using the pulse width modulation signal generation function of the micro control unit 210 and a signal selection function of the second multiplexer 1520, and may transmit the first modulated power supply voltage VCC_PWM to the first power voltage input terminal N2 of the power control circuit 150.

Meanwhile, referring to FIG. 15, the signal (the first modulated power supply voltage VCC_PWM or the first power voltage VCC_DC) output from the second multiplexer 1520 may be input to a timing controller 140 as an input signal VCC2 of the timing controller 140.

Figure 16:
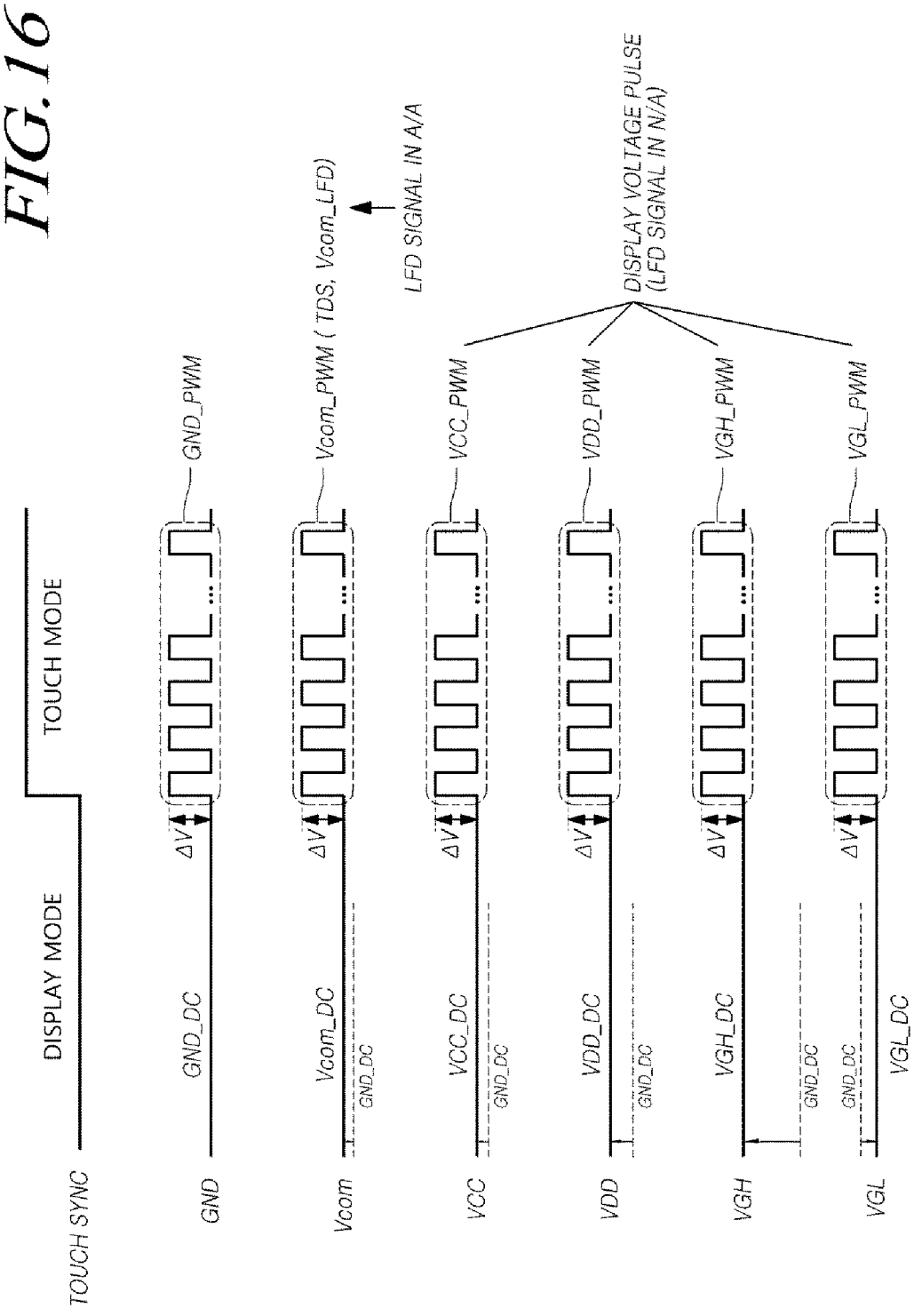
FIG. 16 illustrates main signals of a touch system that can perform full load free driving (Full LFD) in the touch sensitive display device, according to exemplary embodiments of the present invention.

FIG. 16 illustrates main signals of a touch system that can perform full load free driving (Full LFD) in the touch sensitive display device 100, according to exemplary embodiments of the present invention.

FIG. 16 illustrates main signals of the touch system of FIG. 15 under the assumption that a display mode and a touch mode progress in a time-division manner.

Referring to FIG. 16, the display mode and the touch mode progress in a time-division manner according to a touch synchronization signal TOUCH SYNC that is generated by the timing controller 140, the micro control unit 210, or another controller (not illustrated).

First, a situation in which signals are output for the display mode period will be described.

For the display mode period, the micro control unit 210 merely outputs a DC-type ground voltage GND_DC rather than a pulse width modulation signal according to a pulse width modulation control.

The first multiplexer 1410 outputs the input DC-type ground voltage GND_DC, as a ground signal GND, to the ground voltage input terminal N1 of the power control circuit 150 according to a first multiplexer control signal (or the touch synchronization signal TOUCH SYNC).

In this case, the second multiplexer 1520 outputs a first DC-type input power voltage VCC_DC, as a first power signal VCC1, to the first power voltage input terminal N2 of the power control circuit 150 according to a second multiplexer control signal (or the touch synchronization signal TOUCH SYNC).

The power control circuit 150 may output a DC type common electrode voltage Vcom_DC as a common electrode signal Vcom, a first DC-type power voltage VCC_DC as a first power signal VCC, a second DC-type power voltage VDD_DC as a second power signal VDD, a DC-type gate high-level voltage VGH_DC as a gate high-level signal VGH, and a DC-type gate low-level voltage VGL_DC as a gate low-level signal VGL, by using the DC-type ground voltage GND_DC input to the ground voltage input terminal N1 and the first DC-type power voltage VCC_DC input to the first power voltage input terminal N2.

Next, a situation in which signals are output for the touch mode period will be described.

For the touch mode period, the micro control unit 210 outputs a modulated ground voltage GND_PWM that has an amplitude of ΔV and a DC-type ground voltage GND_DC according to a pulse width modulation control.

The first multiplexer 1410 selects the modulated ground voltage GND_PWM, as a ground signal GND, from the modulated ground voltage GND_PWM and the DC-type ground voltage GND_DC which are input thereto, and outputs the modulated ground voltage GND_PWM to the ground voltage input terminal N1 of the power control circuit 150 according to the first multiplexer control signal (or the touch synchronization signal TOUCH SYNC).

The second multiplexer 1520 selects the first modulated power supply voltage VCC_PWM, as a first power signal VCC1, from the first modulated power supply voltage VCC_PWM and the first DC-type power voltage VCC_DC which are input thereto, and outputs the selected first modulated power supply voltage VCC_PWM to the first power voltage input terminal N2 of the power control circuit 150 according to the second multiplexer control signal (or the touch synchronization signal TOUCH SYNC). Here, the modulated ground voltage GND_PWM selected to be the first power signal VCC1 is a first modulated power supply voltage VCC_PWM.

The power control circuit 150 may output a modulated common electrode voltage Vcom_PWM as the common electrode signal Vcom, the first modulated power supply voltage VCC_PWM as the first power signal VCC, a second modulated power supply voltage VDD_PWM as the second power signal VDD, a modulated gate high-level supply voltage VGH_PWM as the gate high-level signal VGH, and a modulated gate low-level supply voltage VGL_PWM as the gate low-level signal VGL, by using the modulated ground voltage GND_PWM input to the ground voltage input terminal N1 and the first modulated power supply voltage VCC_PWM input to the first power voltage input terminal N2.

When the power control circuit 150 outputs the modulated common electrode voltage Vcom_PWM, as the common electrode signal Vcom, to the first drive circuit 810, the first drive circuit 810 provides a touch driving signal TDS to a common electrode CEs subjected to sensing and a common electrode load free driving signal Vcom_LFD to another common electrode CEo by using the modulated common electrode voltage Vcom_PWM.

Here, the modulated common electrode voltage Vcom_PWM has the same amplitude (ΔV) as the modulated ground voltage GND_PWM.

The common electrode load free driving signal Vcom_LFD is a load free driving signal in the active area (A/A).

The first modulated power supply voltage VCC_PWM, the second modulated power supply voltage VDD_PWM, the modulated gate high-level supply voltage VGH_PWM, and the modulated gate low-level supply voltage VGL_PWM, which are modulated display supply voltages, are applied to lines (an LOP line, an LOF line, and an LOG line) in the non-active area (N/A) and are load free driving signals in the non-active area (N/A).

The modulated display supply voltages have the same amplitude (ΔV) as the modulated ground voltage GND_PWM.

As shown in FIG. 16, during the touch mode, most of the signals are square wave AC signals that have a DC offset compared to GND_PWM. Each signal includes a series of voltage pulses. For each signal, the voltage pulses have substantially the same phase and amplitude as the other signals. The average voltage level of most of the signals during the touch mode is higher than GND_PWM, with the exception of VGL_PWM which has a lower voltage level than GND_PWM.

Figure 17:
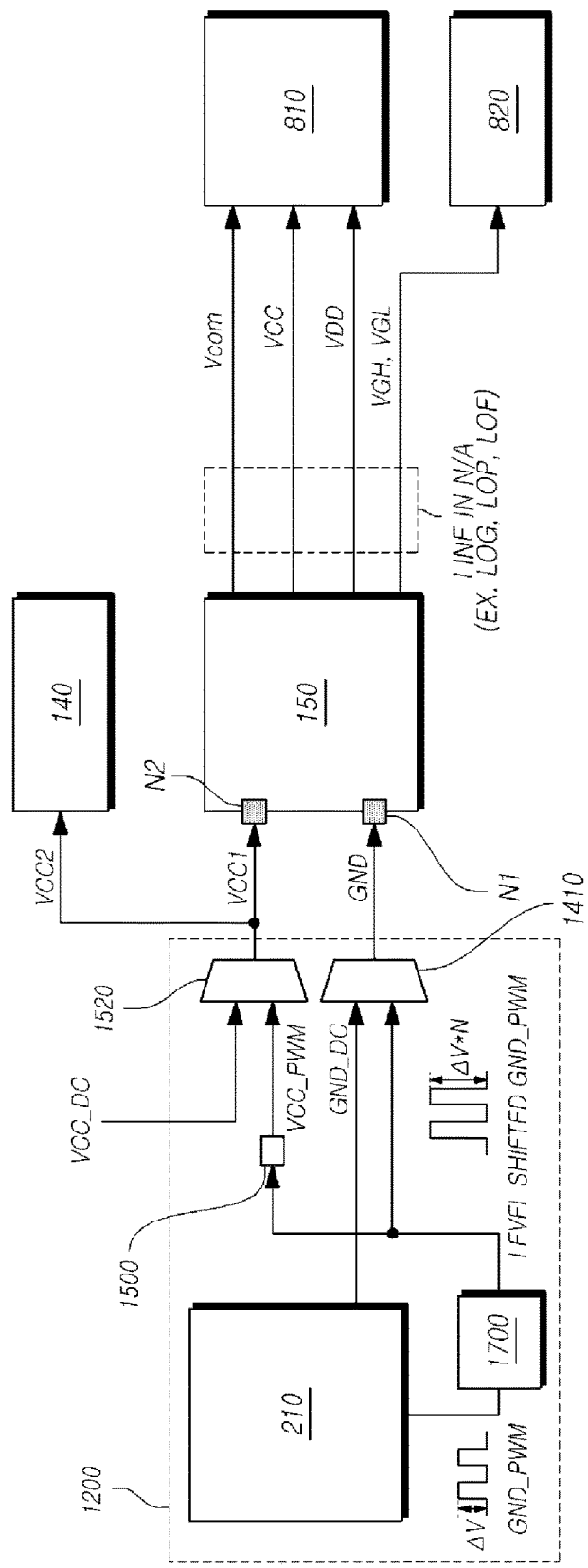
FIG. 17 illustrates a touch system that can perform full load free driving (Full LFD) in the touch sensitive display device, according to yet another exemplary embodiment of the present invention.
Figure 18:
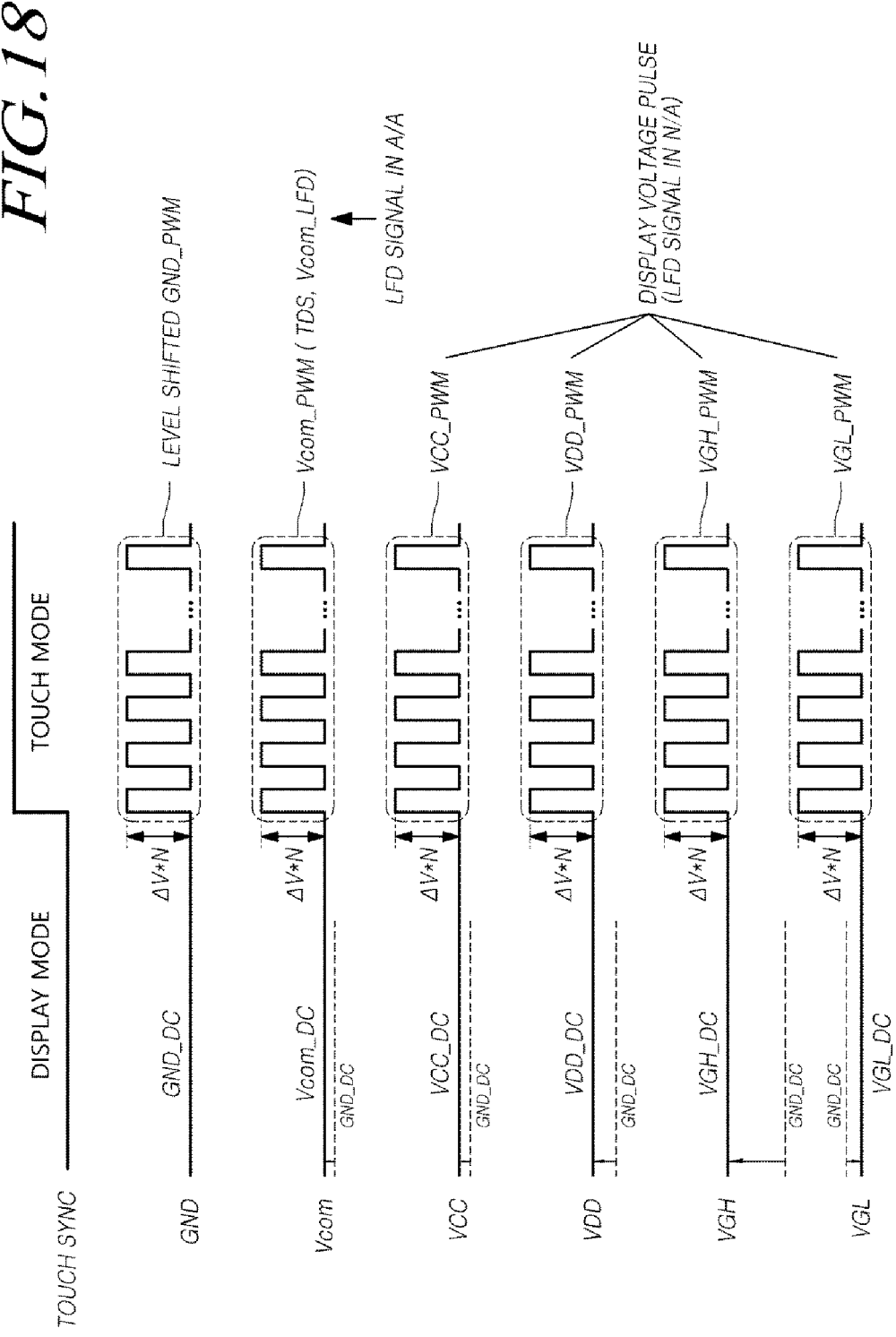
FIG. 18 illustrates main signals of the touch system that can perform full load free driving (Full LFD) in the touch sensitive display device, according to exemplary embodiments of the present invention.

FIG. 17 illustrates a touch system that can perform full load free driving (Full LFD) in the touch sensitive display device 100, according to yet another exemplary embodiment of the present invention, and FIG. 18 illustrates main signals of the touch system that has the structure illustrated in FIG. 17.

In order to adjust the performance and efficiency of touch driving and sensing and load free driving, a modulated ground voltage GND_PWM that is a reference for all signals associated with the touch driving and sensing and the load free driving has to be able to be adjusted.

A signal control circuit 1200 may further include a level shifter 1700 that adjusts (shifts) the level (amplitude) of the modulated ground voltage GND_PWM output from a micro control unit 210 and outputs the adjusted modulated ground voltage GND_PWM.

The level shifter 1700 is electrically connected between the micro control unit 210 and two multiplexers 1410, 1520 to adjust (shift) the level (amplitude) of the modulated ground voltage GND_PWM output from the micro control unit 210 and transmit the modulated ground voltage GND_PWM, the level of which has been adjusted, to the two multiplexers 1410 and 1520.

For a touch mode period, the first multiplexer 1410 selects the modulated ground voltage GND_PWM, the level of which has been adjusted by the level shifter 1700, and outputs the same to a power control circuit 150.

For the touch mode period, the second multiplexer 1520 selects the first modulated power supply voltage VCC_PWM and outputs the same to the power control circuit 150.

Referring to FIG. 18, in cases where the amplitude of the modulated ground voltage GND_PWM output from the micro control unit 210 is ΔV, and the level shifter 1700 amplifies the level (amplitude) of the modulated ground voltage GND_PWM N times (N: a real number) to output the modulated ground voltage GND_PWM, the amplitude of the modulated ground voltage GND_PWM output from the level shifter 1700 is N*ΔV.

A first modulated power supply voltage VCC_PWM, a second modulated power supply voltage VDD_PWM, a modulated gate high-level supply voltage VGH_PWM, and a modulated gate low-level supply voltage VGL_PWM, which are modulated display supply voltages, also have the same amplitude (N*ΔV) as the modulated ground voltage GND_PWM output from the level shifter 1700.

The above-described level shifter 1700 may adjust (transform) the level of the modulated ground voltage GND_PWM that is a reference for all the signals associated with the touch driving and sensing, the load free driving, etc., thereby efficiently adjusting all the signals associated with the touch driving and sensing, the load free driving, etc. Therefore, it is possible to effectively adjust the performance and efficiency of the touch driving and sensing, the load free driving, etc.

Figure 20:
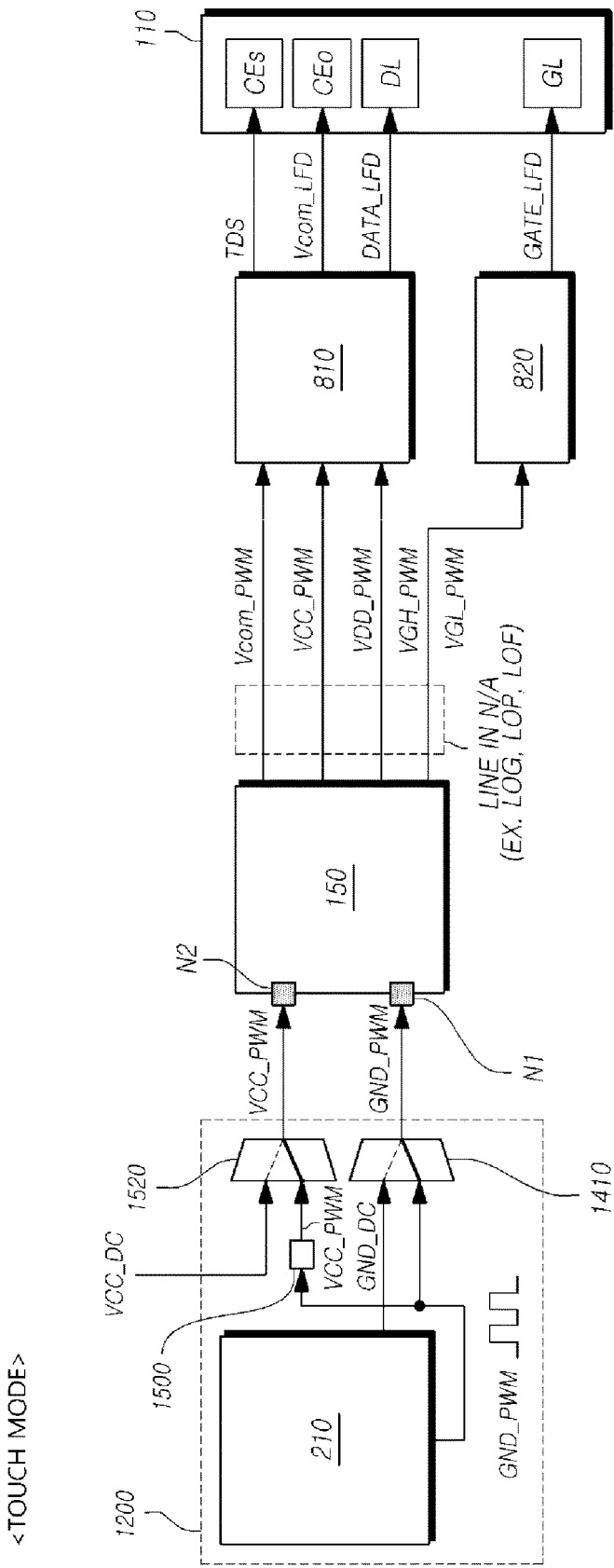
FIGS. 20 and 21 illustrate two signal input methods for the power control circuit in a touch mode period of the touch sensitive display device, according to exemplary embodiments of the present invention.
Figure 21:
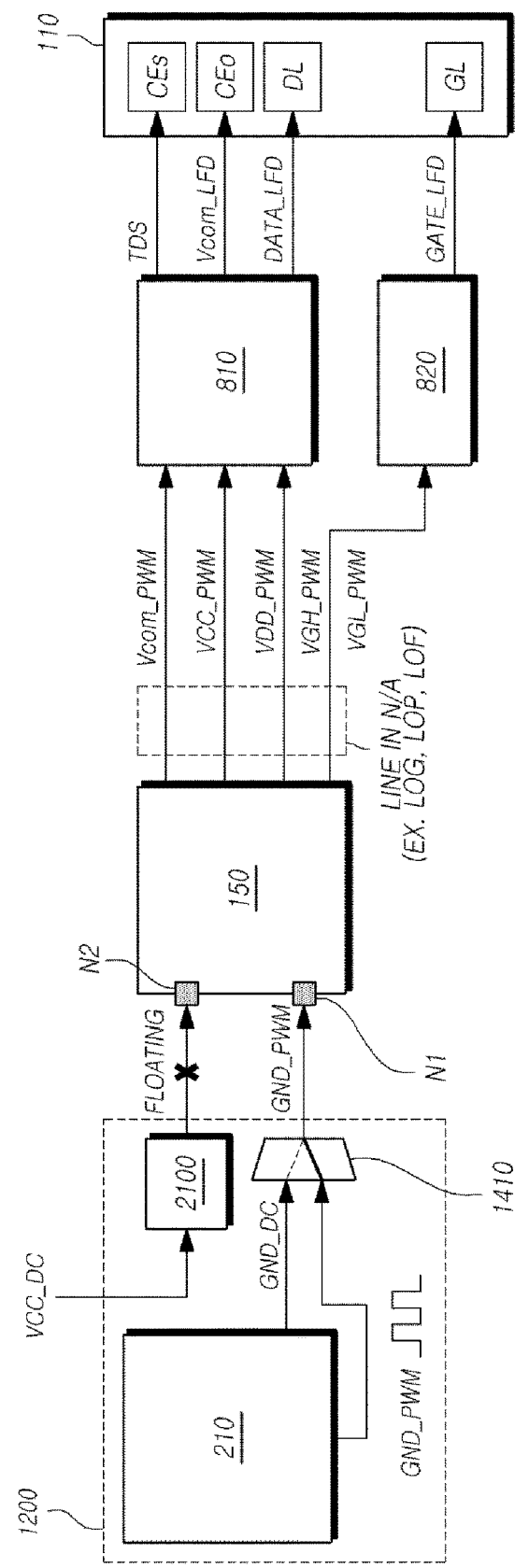

FIG. 19 illustrates two cases in which signal(s) are input to the two input terminals N1 and N2 of the power control circuit 150 of the touch sensitive display device 100, according to exemplary embodiments of the present invention, and FIGS. 20 and 21 illustrate signal input methods for the power control circuit 150 in the two cases of inputting the signal(s).

Referring to FIG. 19, the two cases (case 1 and case 2) in which signal(s) are input to the ground voltage input terminal N1 and the first power voltage input terminal N2 of the power control circuit 150 for a touch mode period are illustrated.

Referring to FIG. 19, in the case 1, signals are input to both the ground voltage input terminal N1 and the first power voltage input terminal N2 of the power control circuit 150, respectively, for the touch mode period.

In the case 1, the signals input to the ground voltage input terminal N1 and the first power voltage input terminal N2 of the power control circuit 150 are pulse width modulation signals.

Referring to FIGS. 19 and 20, in the case 1, a modulated ground voltage GND_PWM is input, as a ground signal GND, to the ground power input terminal N1 of the power control circuit 150, and a first modulated power supply voltage VCC_PWM is input, as a first power signal VCC1, to the first power voltage input terminal N2 of the power control circuit 150.

In the case 1, the power control circuit 150 may generate various types of signals by using both the modulated ground voltage GND_PWM and the first modulated power supply voltage VCC_PWM.

Referring to FIG. 19, in the case 1, the modulated ground voltage GND_PWM input to the ground voltage input terminal N1 and the first modulated power supply voltage VCC_PWM input to the first power voltage input terminal N2 of the power control circuit 150 have an equal voltage difference ΔV1 therebetween at all points.

As described above, when the signals are input to both the ground voltage input terminal N1 and the first power voltage input terminal N2 of the power control circuit 150, the voltage difference between the signal GND_PWM input to the ground voltage input terminal N1 and the signal VCC_PWM input to the first power voltage input terminal N2 of the power control circuit 150 is maintained constant, thereby making it possible for the power control circuit 150 to normally perform various types of signal controls.

Meanwhile, referring to FIG. 19, in the case 2, a modulated ground voltage GND_PWM of a pulse width modulation signal type is input, as a ground signal GND, only to the ground voltage input terminal N1, among the ground voltage input terminal N1 and the first power voltage input terminal N2 of the power control circuit 150, for a touch mode period.

In the case 2, as illustrated in FIG. 21, the first power voltage input terminal N2 is floated while the modulated ground voltage GND_PWM is input to the ground voltage input terminal N1 of the power control circuit 150.

Accordingly, in the case 2, the power control circuit 150 may generate various types of signals by using only the modulated ground voltage GND_PWM.

Therefore, the signal control circuit 1200 may not include the second multiplexer 1520. Instead, if necessary, the signal control circuit 1200 may further include a floating circuit 2100 that transmits a first DC-type power voltage VCC_DC to the first power voltage input terminal N2 of the power control circuit 150, and in the touch mode period, prevents the first DC-type power voltage VCC_DC from being transmitted to the first power voltage input terminal N2 of the power control circuit 150.

The floating circuit 2100 may be implemented as a multiplexer or a switching device that receives only the first DC-type power voltage VCC_DC and outputs the same only in a period other than the touch mode period.

As described above, in the touch mode period, the first power voltage input terminal N2 of the power control circuit 150 is floated so that the power control circuit 150 generates various types of signals by using only the modulated ground voltage GND_PWM. Therefore, signal control processing of the power control circuit 150 can be simplified.

Figure 22:
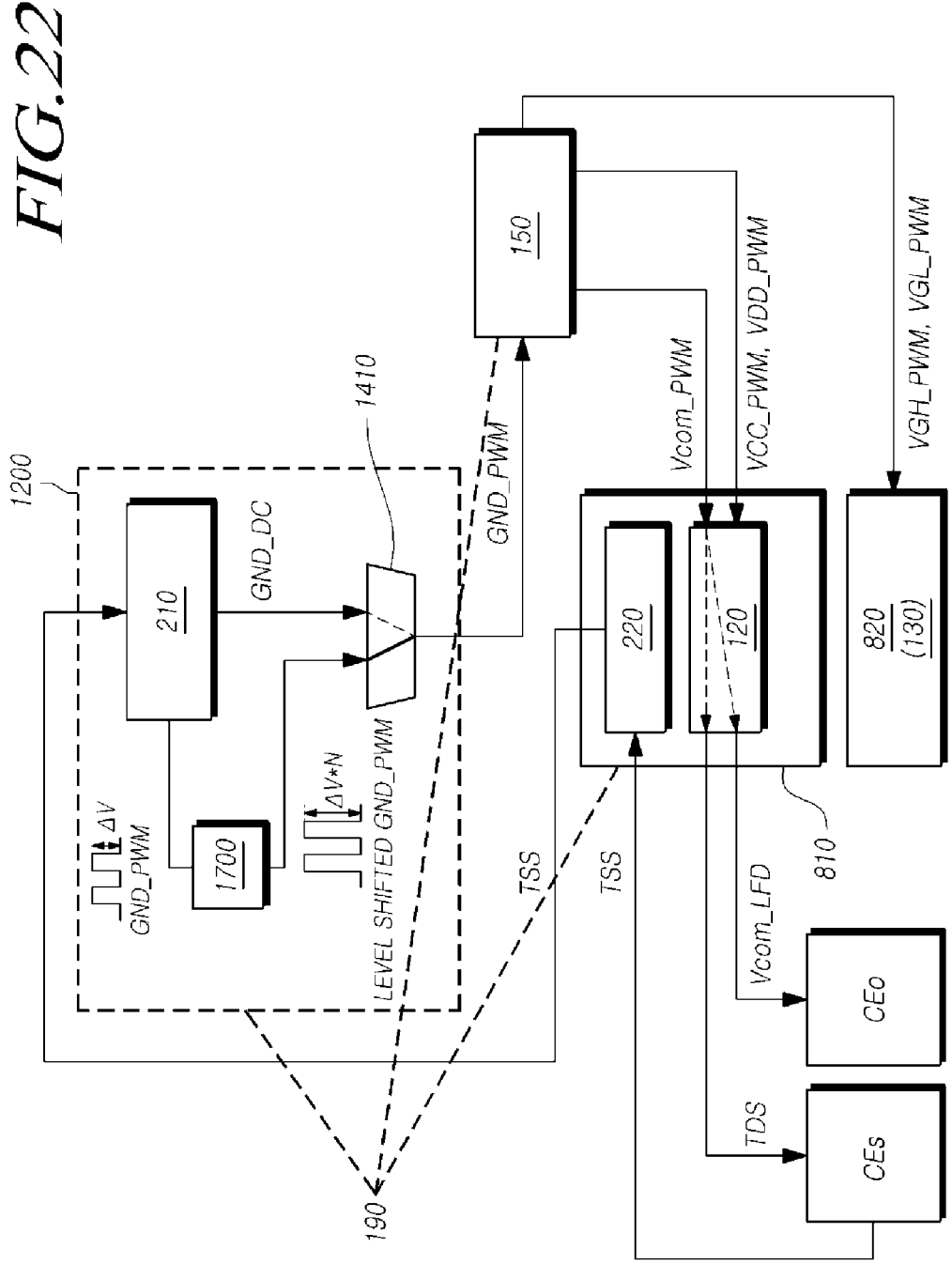
FIG. 22 is a diagram illustrating signal transmission between configurations in the touch system of the touch sensitive display device, according to exemplary embodiments of the present invention.

FIG. 22 is a signal transmission diagram illustrating the signal transmission between the configurations in the above-described touch system.

Referring to FIG. 22, the touch system (or the touch circuit 190) of the touch sensitive display device 100, according to the exemplary embodiments of the present invention, may include: the signal control circuit 1200 that generates the modulated ground voltage GND_PWM which is a pulse width modulation signal, the level of which has been transformed; the power control circuit 150 that generates and outputs the modulated common electrode voltage Vcom_PWM and the modulated display supply voltages VCC_PWM, VDD_PWM, VGH_PWM, and VGL_PWM which have the same phase as the modulated ground voltage GND_PWM; the first drive circuit 810 that receives the modulated common electrode voltage Vcom_PWM and the first modulated display supply voltages (e.g., VCC_PWM and VDD_PWM) and sequentially provides the touch driving signal TDS, which corresponds to the modulated common electrode voltage Vcom_PWM, to the plurality of common electrodes CE for the touch mode period; and the second drive circuit 820 that receives the second modulated display supply voltages (e.g., VGH_PWM and VGL_PWM) as the load free driving signal in the non-active area (N/A).

The first drive circuit 810 provides the touch driving signal TDS, which corresponds to the modulated common electrode voltage Vcom_PWM, to a common electrode CEs subjected to sensing and provides the common electrode load free driving signal Vcom_LFD, which corresponds to the modulated common electrode voltage Vcom_PWM, to the remaining common electrodes CEo.

For the touch mode period, the touch sensitive display device 100, according to the above-described exemplary embodiments of the present invention, may modulate the ground voltage GND_DC, which causes modulation of all signals required for touch driving and load free driving to the same phase.

Therefore, the touch sensitive display device 100 can more simply and efficiently provide the touch driving and the load free driving. In addition, the touch sensitive display device 100 can prevent parasitic capacitance from being generated in the non-active area (N/A) as well as in the active area (A/A), thereby further increasing the accuracy of sensing.

Figure 23:
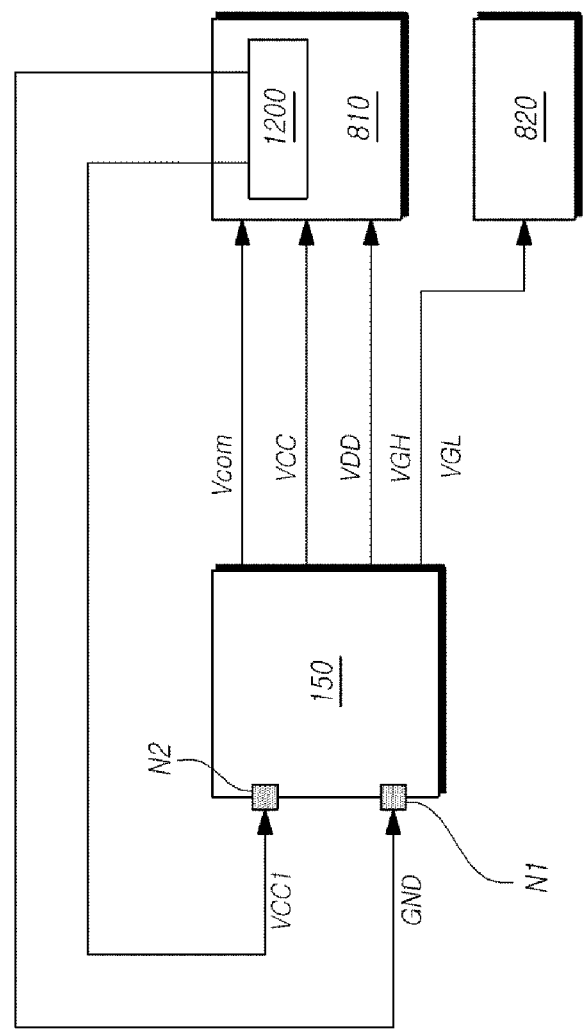
FIG. 23 illustrates a touch system in which a first drive circuit includes a signal control circuit in the touch sensitive display device, according to exemplary embodiments of the present invention.
Figure 24:
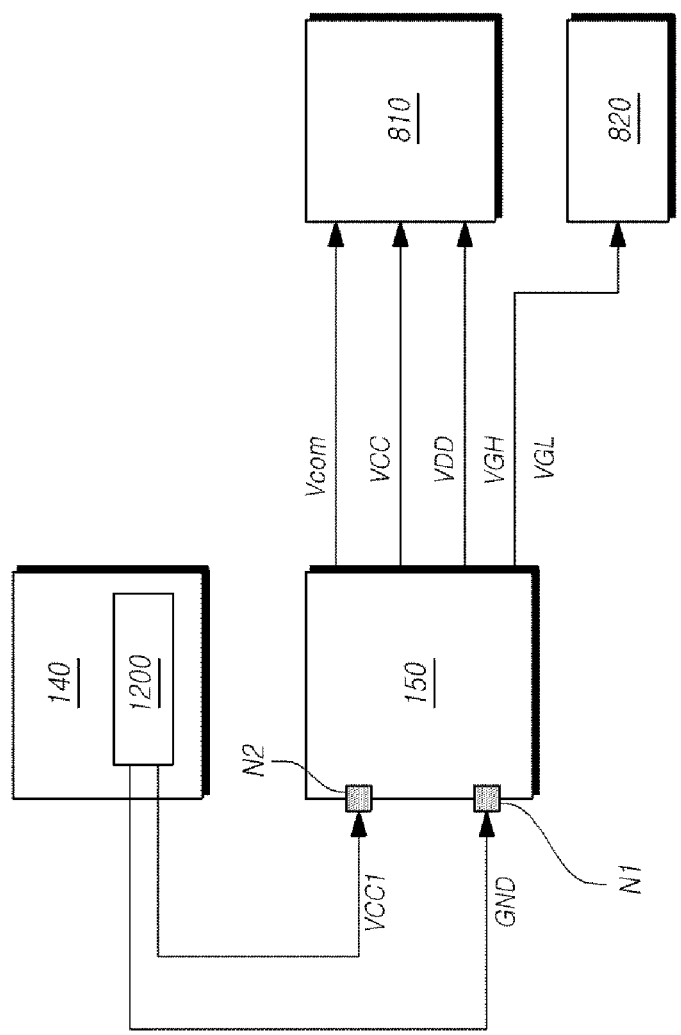
FIG. 24 illustrates a touch system in which a timing controller includes a signal control circuit in the touch sensitive display device, according to exemplary embodiments of the present invention.

FIG. 23 illustrates a touch system in which the first drive circuit 810 includes the signal control circuit 1200 in the touch sensitive display device 100, according to exemplary embodiments of the present invention, and FIG. 24 illustrates a touch system in which the timing controller 140 includes the signal control circuit 1200 in the touch sensitive display device 100, according to exemplary embodiments of the present invention.

As illustrated in FIG. 23, the signal control circuit 1200 that generates the modulated ground voltage GND_PWM as the ground signal GND may be included in the first drive circuit 810.

As illustrated in FIG. 24, the signal control circuit 1200 that generates the modulated ground voltage GND_PWM as the ground signal GND may be included in the timing controller 140.

Hereinafter, the above-described configurations in the touch sensitive display device 100 will be individually described in more detail.

Figure 25:
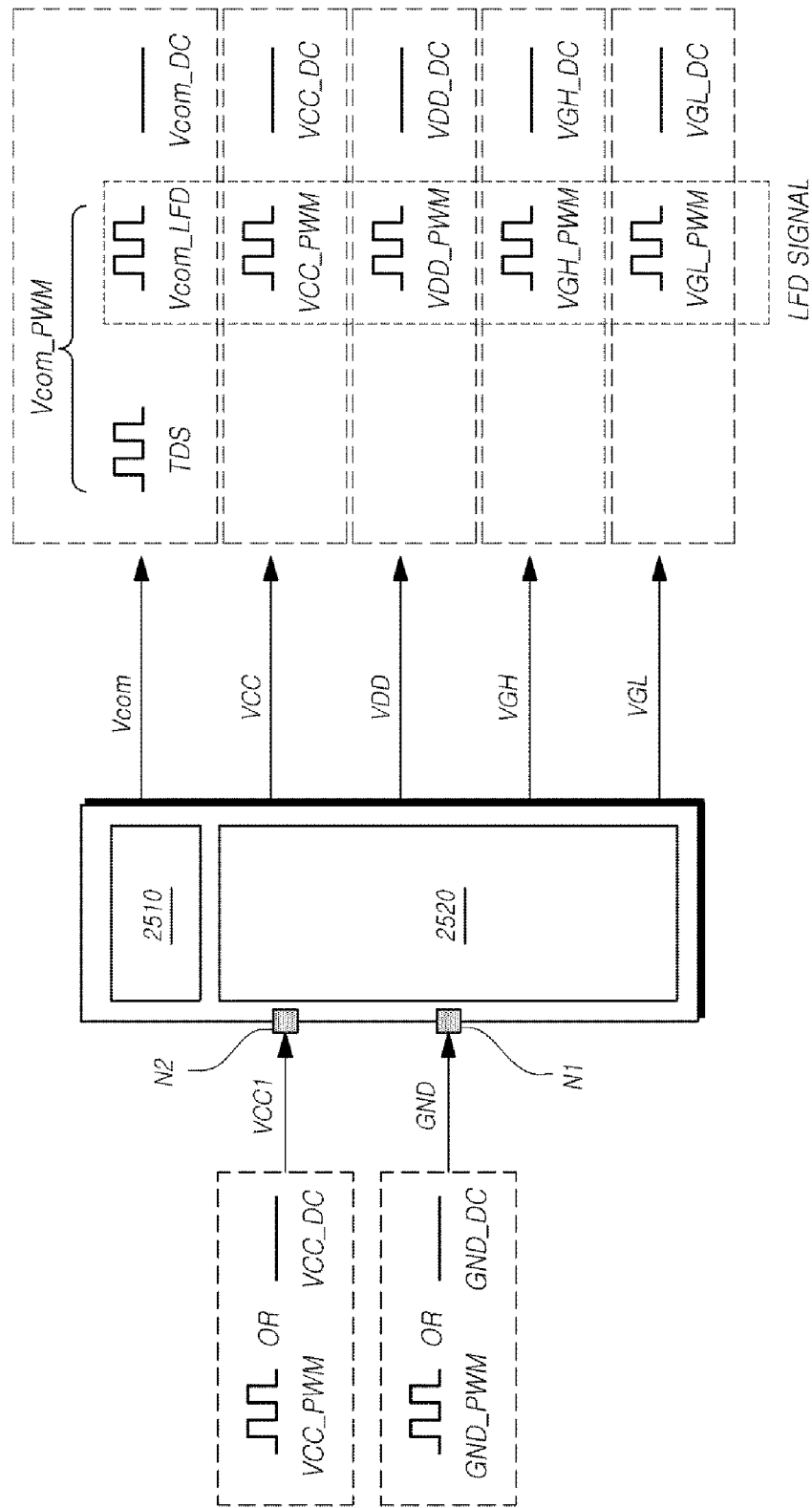
FIG. 25 illustrates a power control circuit of the touch sensitive display device, according to exemplary embodiments of the present invention.

FIG. 25 illustrates the power control circuit 150 of the touch sensitive display device 100 according to the exemplary embodiments of the present invention.

Referring to FIG. 25, the power control circuit 150 of the touch sensitive display device 100, according to the exemplary embodiments of the present invention, may include a ground voltage input terminal N1, a first pulse generation unit 2510, a second pulse generation unit 2520, and a first power voltage input terminal N2.

For a touch mode period, a pulse-width modulated ground voltage GND_PWM may be input, as a ground signal GND, to the ground voltage input terminal N1, and for a display mode period, a DC-type ground voltage GND_DC may be input, as a ground signal GND, to the ground voltage input terminal N1.

For the touch mode period, the first pulse generation unit 2510 generates a modulated common electrode voltage Vcom_PWM that is synchronized with the modulated ground voltage GND_PWM and has a pulse width modulated on the basis of a common electrode voltage Vcom_DC, and outputs the modulated common electrode voltage Vcom_PWM as a common electrode signal Vcom.

Here, the modulated common electrode voltage Vcom_PWM may be used as a touch driving signal TDS or a common electrode load free driving signal Vcom_LFD.

The first pulse generation unit 2510 may output the common electrode voltage Vcom_DC as the common electrode signal Vcom for the display mode period.

For the display mode period, the second pulse generation unit 2520 may generate modulated display supply voltages VCC_PWM, VDD_PWM, VGH_PWM, and VGL_PWM that are synchronized with the modulated ground voltage GND_PWM and have pulse widths modulated on the basis of DC-type display voltages VCC_DC, VDD_DC, VGH_DC, and VGL_DC, and may output the generated modulated display supply voltages VCC_PWM, VDD_PWM, VGH_PWM, and VGL_PWM as display voltage signals VCC, VDD, VGH, and VGL.

For the display mode period, the second pulse generation unit 2520 may output the DC-type display voltages VCC_DC, VDD_DC, VGH_DC, and VGL_DC as the display voltage signals VCC, VDD, VGH, and VGL.

The common electrode load free driving signal Vcom_LFD is a load free driving signal in an active area (A/A), and the modulated display supply voltages VCC_PWM, VDD_PWM, VGH_PWM, and VGL_PWM are load free driving signals in a non-active area (N/A).

For the touch mode period, the first modulated power supply voltage VCC_PWM, the pulse width of which has been modulated, may be input to the first power voltage input terminal N2, or the first power voltage input terminal N2 may be electrically floated.

For the display mode period, the first power voltage VCC_DC, which is a DC voltage, may also be input to the first power voltage input terminal N2.

The above-described power control circuit 150 can efficiently process a power control for touch driving and load free driving.

Figure 26:
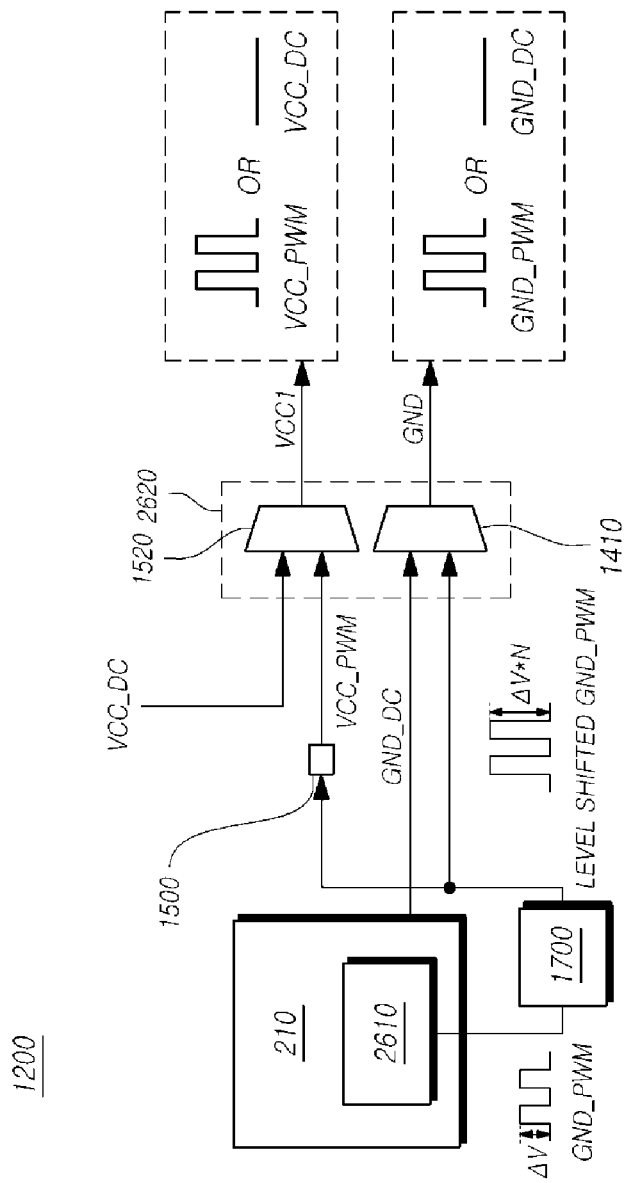
FIG. 26 illustrates a signal control circuit of the touch sensitive display device, according to exemplary embodiments of the present invention.

FIG. 26 illustrates the signal control circuit 1200 of the touch sensitive display device 100 according to the exemplary embodiments of the present invention.

Referring to FIG. 26, the signal control circuit 1200 of the touch sensitive display device 100, according to the exemplary embodiments of the present invention, may include: a pulse generator 2610 that generates a modulated ground voltage GND_PWM; and a signal selection circuit 2620 that receives a ground voltage GND_DC and the modulated ground voltage GND_PWM, selects one of the ground voltage GND_DC and the modulated ground voltage GND_PWM, and outputs the selected one as a ground signal GND.

For a touch mode period, the signal selection circuit 2620 may select the modulated ground voltage GND_PWM to output the same as the ground signal GND.

The signal selection circuit 2620 may receive a first power voltage VCC_DC and a first modulated power supply voltage VCC_PWM, select one of the first power voltage VCC_DC and the first modulated power supply voltage VCC_PWM, and output the selected one as a first power signal VCC1.

For the touch mode period, the signal selection circuit 2620 may select the modulated ground voltage GND_PWM as a first modulated power supply voltage VCC_PWM and to output the same as the first power signal VCC1.

The above-described signal control circuit 1200 makes it possible to efficiently generate the modulated ground voltage GND_PWM that is a reference for generating a touch driving signal TDS of a pulse width modulation signal type and various load free driving signals (e.g., Vcom_LFD, DATA_LFD, GATE_LFD, VCC_PWM, VDD_PWM, VGH_PWM, VGL_PWM, etc.) that are used in the touch sensitive display device 100.

Referring to FIG. 26, the signal control circuit 1200 may further include a level shifter circuit 1700 that transforms the level of the modulated ground voltage GND_PWM output from the pulse generator 2610 and transmits the transformed modulated ground voltage GND_PWM to the signal selection circuit.

The level shifter 1700 makes it possible to diversely adjust the modulated ground voltage GND_PWM differently in consideration of the performance and efficiency of touch driving and load free driving.

As illustrated in FIG. 26, the pulse generator 2610 may be, for example, an internal module of a micro control unit 210.

As illustrated in FIG. 26, the signal selection circuit 2620 may be implemented, for example, as a first multiplexer 1410 and a second multiplexer 1520.

Figure 27:
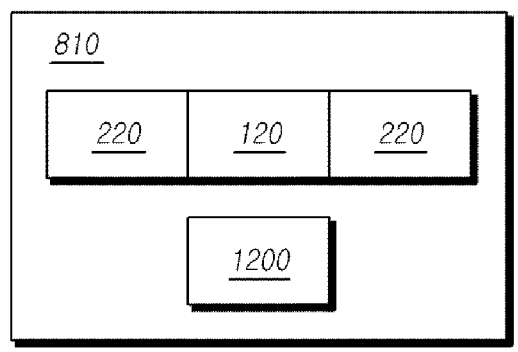
FIG. 27 illustrates a first drive circuit of the touch sensitive display device, according to exemplary embodiments of the present invention.

FIG. 27 illustrates the first drive circuit 810 of the touch sensitive display device 100 according to the exemplary embodiments of the present invention.

Referring to FIG. 27, the first drive circuit 810 of the touch sensitive display device 100, according to the exemplary embodiments of the present invention, may include: a data drive circuit 120 that performs data driving, such as outputting a data voltage and outputting a common voltage, for a display mode period; and at least one touch sensing signal detection circuit 220 that detects a touch sensing signal TSS for touch sensing from a common electrode CEs, to which a touch driving signal TDS is applied, for a touch mode period.

Here, the touch sensing signal TSS has a signal waveform that corresponds to that of the touch driving signal TDS. The touch driving signal TDS has the same phase as a modulated ground voltage GND_PWM of a pulse width modulation signal type.

Further, the first drive circuit 810 may also provide touch driving and load free driving in order to provide the touch driving signal TDS to the common electrode CEs subjected to sensing and provide a common electrode load free driving signal Vcom_LFD to another common electrode CEo.

The above-described first drive circuit 810 makes it possible for one drive chip to provide data driving, touch driving, load free driving, and touch sensing altogether. Therefore, the number of components can be reduced, and a touch screen panel can efficiently provide data driving, touch driving, and load free driving that are suitable for a touch structure embedded in the display panel 110.

Meanwhile, referring to FIG. 27, the first drive circuit 810 of the touch sensitive display device 100, according to the exemplary embodiments of the present invention, may further include a signal control circuit 1200 that generates the GND_PWM that is a reference for generating the touch driving signal TDS (see FIG. 23).

According to the above description, the first drive circuit 810 may be provided to generate the modulated ground voltage GND_PWM that is a reference for generating signals for touch driving and load free driving.

Meanwhile, the first drive circuit 810 of the touch sensitive display device 100, according to the exemplary embodiments of the present invention, may receive modulated display supply voltages (e.g., VCC_PWM and VDD_PWM), which have phases corresponding to that of the modulated ground voltage GND_PWM, for the touch mode period.

As described above, the modulated display supply voltages (e.g., VCC_PWM and VDD_PWM), which have phases and amplitudes corresponding to those of the modulated ground voltage GND_PWM, are transmitted to the first drive circuit 810 for the touch mode period so that a potential difference between the modulated display supply voltages (e.g., VCC_PWM and VDD_PWM) and the touch driving signal TDS and the touch sensing signal TSS, which have the same phase and amplitude as the modulated ground voltage GND_PWM, can be reduced or removed, thereby effectively preventing parasitic capacitance from being generated in a path (a line in a non-active area (N/A)) along which the modulated display supply voltages (e.g., VCC_PWM and VDD_PWM) are transmitted.

Figure 28:
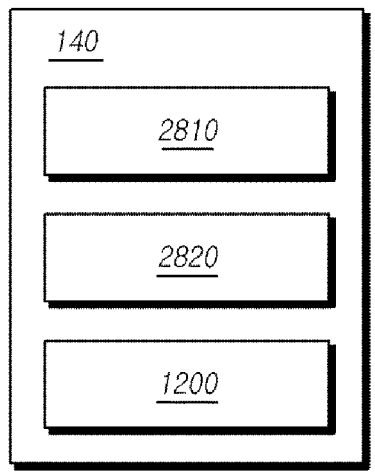
FIG. 28 illustrates a timing controller of the touch sensitive display device, according to exemplary embodiments of the present invention.

FIG. 28 illustrates the timing controller 140 of the touch sensitive display device 100 according to the exemplary embodiments of the present invention.

Referring to FIG. 28, the timing controller 140 of the touch sensitive display device 100, according to the exemplary embodiments of the present invention, may include: a mode timing control unit 2810 that controls the timings of a display mode and a touch mode; an image data output unit 2820 that outputs image data for data driving for a display mode period; and a signal control circuit 1200 that generates a modulated ground voltage GND_PWM of a pulse width modulation signal type for swinging a touch driving signal and a load free driving signal for a touch mode period.

According to the above description, the timing controller 140 may be provided to generate the modulated ground voltage GND_PWM that is a reference for generating various types of signals required for touch driving and load free driving.

Figure 29:
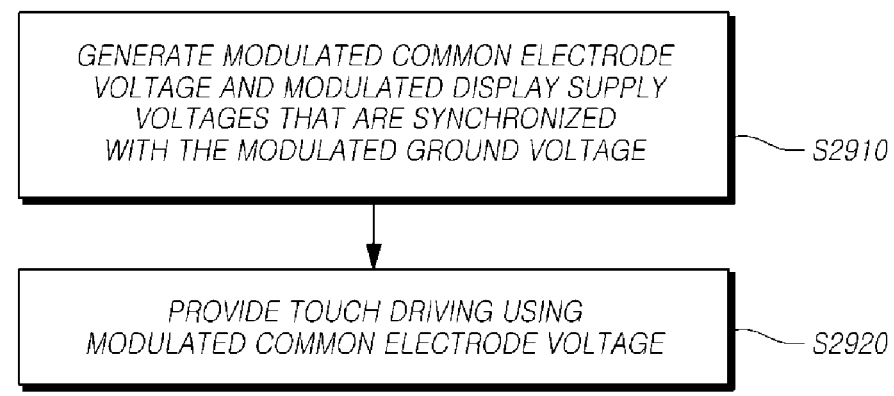
FIG. 29 is a flowchart illustrating a method for driving the touch sensitive display device, according to exemplary embodiments of the present invention.

FIG. 29 is a flowchart illustrating a method for driving the touch sensitive display device 100, according to exemplary embodiments of the present invention.

Referring to FIG. 29, the method for driving the touch sensitive display device 100, which has the plurality of common electrodes CE that are embedded in the display panel 110 and used in touch driving and display driving, may include: a step of generating a pulse-width modulated ground voltage GND_PWM and generating a modulated common electrode voltage Vcom_PWM and modulated display supply voltages VCC_PWM, VDD_PWM, VGH_PWM, and VGL_PWM that are synchronized with the generated modulated ground voltage GND_PWM (S2910); and a step of providing touch driving by using the modulated common electrode voltage Vcom_PWM for a touch mode period (S2920).

Here, when the modulated common electrode voltage Vcom_PWM and the modulated display supply voltages VCC_PWM, VDD_PWM, VGH_PWM, and VGL_PWM are synchronized with the modulated ground voltage GND_PWM, that may mean that the phases thereof are made equal to each other.

Through the above-described driving method, for the touch mode period, it is possible to modulate all signals required for touch driving and load free driving to the same phase by modulating a ground voltage GND_DC, which makes it possible to efficiently provide the touch driving and the load free driving.

Meanwhile, in the step of providing touch driving (S2920), the modulated display supply voltages VCC_PWM, VDD_PWM, VGH_PWM, and VGL_PWM may be applied to at least one of a Line On Glass (LOG), a Line On PCB (LOP), and a Line On Film (LOF).

Therefore, it is possible to effectively prevent parasitic capacitance from being generated in a non-active area (N/A), thereby further increasing the accuracy of touch sensing.

Figure 30:
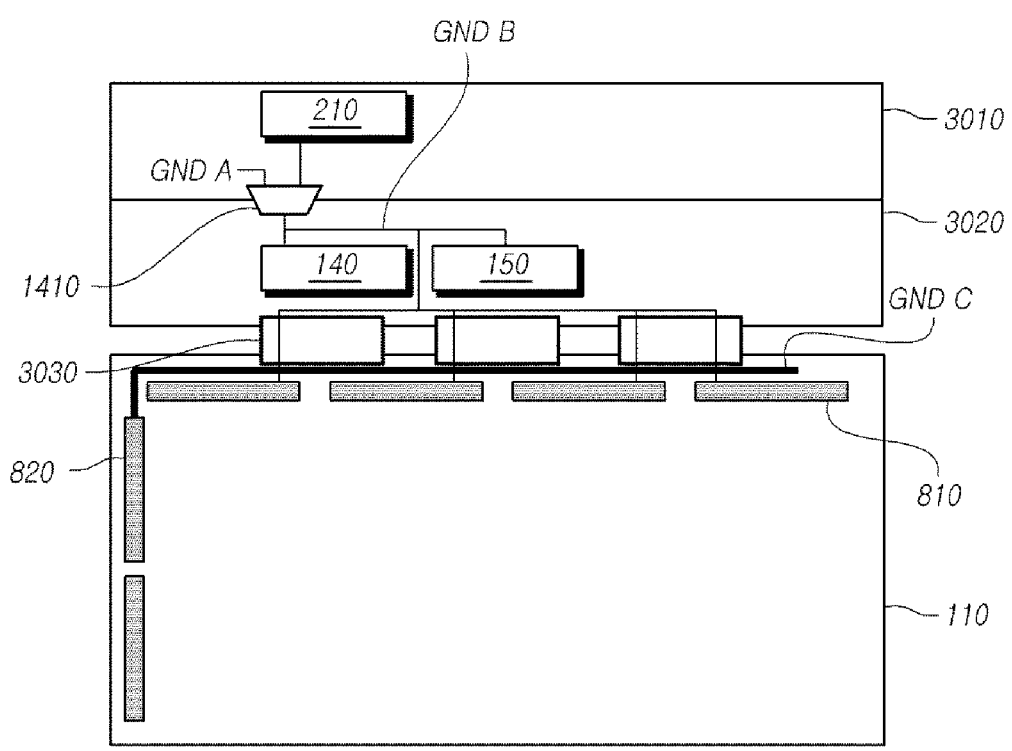
FIGS. 30 and 31 illustrate three ground wirings in the touch sensitive display device according to the exemplary embodiments of the present invention.
Figure 31:
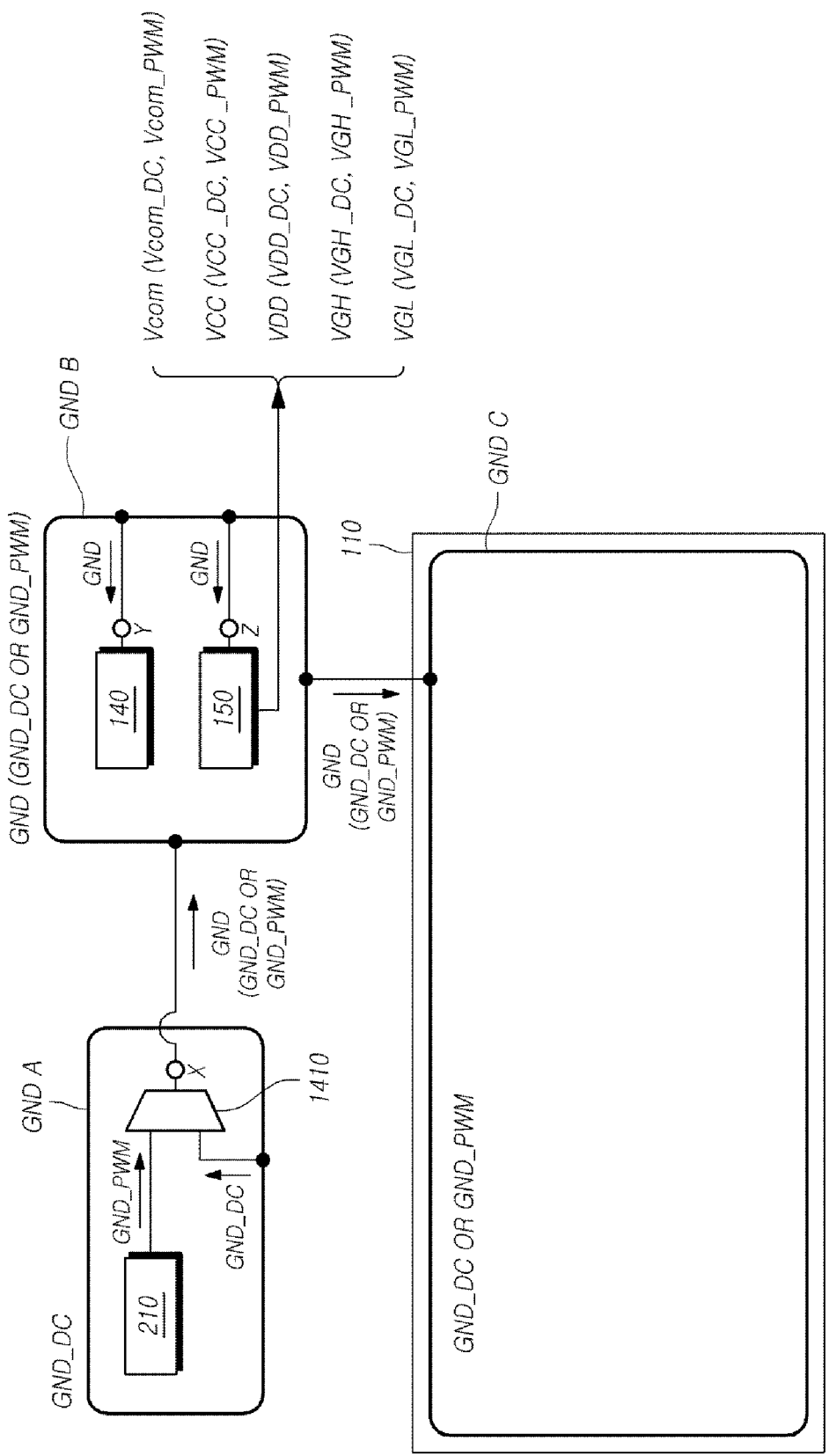

FIGS. 30 and 31 illustrate three ground wirings GND A, GND B, and GND C in the touch sensitive display device 100 according to the exemplary embodiments of the present invention.

Referring to FIGS. 30 and 31, the touch sensitive display device 100, according to the exemplary embodiments of the present invention, may include the first ground wiring GND A and the second ground wiring GND B, and may further include the third ground wiring GND C.

Referring to FIGS. 30 and 31, the first ground wiring GND A is a wiring through which a DC-type ground voltage GND_DC is applied, and may supply the DC-type ground voltage GND_DC to the first multiplexer 1410 or the micro control unit 210.

The second ground wiring GND B electrically connects the output terminal X of the first multiplexer 1410, the input terminal Y of the timing controller 140, and the input terminal Z of the power control circuit 150.

Accordingly, a ground signal GND output from the output terminal of the first multiplexer 1410 is applied to the second ground wiring GND B.

Further, the ground signal GND applied to the second ground wiring GND B may be input to the input terminal of the power control circuit 150 and the input terminal of the timing controller 140.

As illustrated in FIG. 31, in cases where the first ground wiring GND A directly supplies a DC-type ground voltage GND_DC to the first multiplexer 1410, the first multiplexer 1410 receives a modulated ground voltage GND_PWM from the micro control unit 210 and directly receives the DC-type ground voltage GND_DC from the first ground wiring GND A.

Though unlikely, in cases where the first ground wiring GND A supplies a DC-type ground voltage GND_DC to the micro control unit 210, the first multiplexer 1410 may also receive both the DC-type ground voltage GND_DC and a modulated ground voltage GND_PWM from the micro control unit 210.

Referring to FIG. 31, the first multiplexer 1410 supplies, to the second ground wiring GND B, one of the DC-type ground voltage GND_DC, which is received from the first ground wiring GND A or the micro control unit 210, and the modulated ground voltage GND_PWM, which is received from the micro control unit 210, as a ground signal GND.

Accordingly, the timing controller 140 and the power control circuit 150 receives the ground signal GND, which corresponds to one of the DC-type ground voltage GND_DC and the modulated ground voltage GND_PWM, through the second ground wiring GND B.

Using the ground voltage GND_DC or the modulated ground voltage GND_PWM, which corresponds to the ground signal GND received through the second ground wiring GND B, the power control circuit 150 may: output a DC-type common electrode voltage Vcom_DC or a modulated common electrode voltage Vcom_PWM as a common electrode signal Vcom; output a DC-type first power voltage VCC_DC or a first modulated power supply voltage VCC_PWM as a first power signal VCC; output a DC-type second power voltage VDD_DC or a second modulated power supply voltage VDD_PWM as a second power signal VDD; output a DC-type gate high-level voltage VGH_DC or a modulated gate high-level supply voltage VGH_PWM as a gate high-level signal VGH; and output a DC-type gate low-level voltage VGL_DC or a modulated gate low-level supply voltage VGL_PWM as a gate low-level signal VGL.

Referring to FIGS. 30 and 31, the touch sensitive display device 100, according to the exemplary embodiments of the present invention, may further include the third ground wiring GND C that is electrically connected to the second ground wiring GND B and is disposed in the display panel 110.

Accordingly, the ground voltage GND_DC or the modulated ground voltage GND_PWM, which corresponds to the ground signal GND applied to the second ground wiring GND B, may also be applied to the third ground wiring GND C that is disposed in the display panel 110.

The third ground wiring GND C may be formed in the shape of a closed loop along the periphery of the display panel 110 as illustrated in FIG. 31, or may also be open at one point thereof.

Meanwhile, referring to FIG. 30, the first ground wiring GND A may be disposed on a first printed circuit board 3010, and the second ground wiring GND B may be disposed on a second printed circuit board 3020. Here, the first and second printed circuit boards 3010 and 3020 may be different printed circuit boards, or may be integrated into a single printed circuit board.

Referring to FIG. 30, the second printed circuit board 3020 and the display panel 110 may be connected through a connecting member 3030, such as a Flexible Flat Cable (FFC), etc., and the connecting member 3030 may include a wire that electrically connects the second ground wiring GND B and the third ground wiring GND C.

Figure 32:
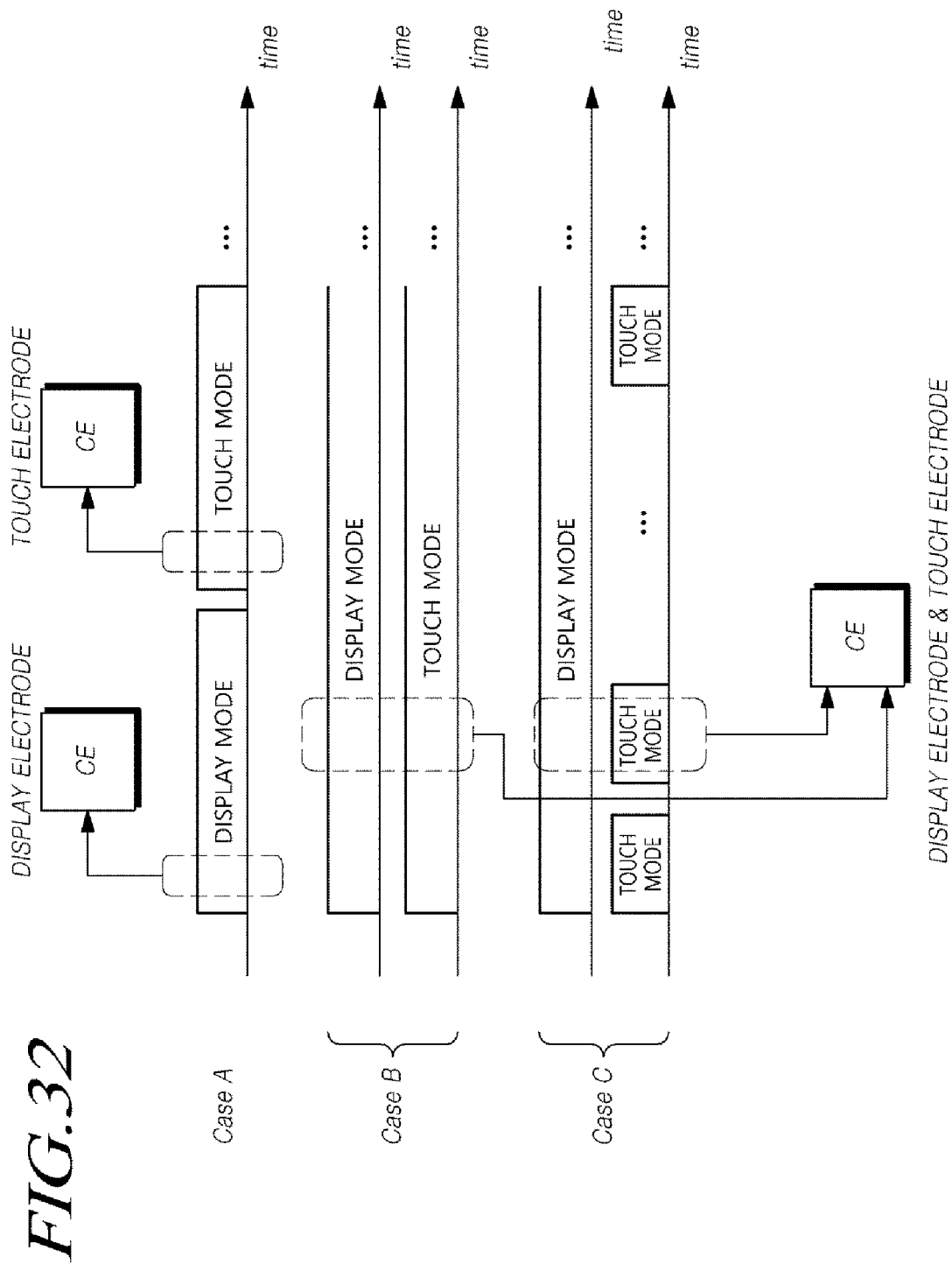
FIG. 32 illustrates the roles of common electrodes according to methods in which a display mode and a touch mode are performed in the touch sensitive display device according to the exemplary embodiments of the present invention.

FIG. 32 illustrates the roles of the common electrodes CE according to methods in which a display mode and a touch mode are performed in the touch sensitive display device 100 according to the exemplary embodiments of the present invention.

Referring to FIG. 32, a display mode and a touch mode may be performed in a method, such as case A, case B, or case C.

In case A, a display mode and a touch mode are sequentially performed in conjunction with each other, and in case B and case C, a display mode and a touch mode are independently performed and may also be simultaneously performed.

In case A, a display mode period and a touch mode period may be separated from each other in a time-division manner.

Accordingly, the common electrodes CE may be driven as an operate only as display electrodes, or may be driven as and operate only as touch electrodes at one time point.

The first drive circuit 810 supplies a DC-type common electrode voltage Vcom_DC to all of the common electrodes CE, which operate as display electrodes, for the display mode period, and sequentially supplies a modulated common electrode voltage Vcom_PWM, as a touch driving signal (TDS), to the common electrodes CE, which operate as touch electrodes, for the touch mode period.

In cases B and C, a display mode and a touch mode are independently performed and may also be simultaneously performed, and a display mode period and a touch mode period may be independent periods that can overlap each other in time.

Accordingly, the common electrodes CE may be driven and operate not only as display electrodes but also as touch electrodes for a period in which the display mode period and the touch mode period overlap each other in time.

When the display mode period and the touch mode period overlap each other in time as described above, the first drive circuit 810 may supply a modulated common electrode voltage Vcom_PWM to all of the common electrodes CE.

In this case, the modulated common electrode voltage Vcom_PWM supplied to at least one of the plurality of common electrodes CE (a common electrode subjected to a touch) is a common electrode voltage used as a display voltage corresponding to a pixel voltage and a touch driving signal (TDS) for touch sensing, and the modulated common electrode voltage Vcom_PWM supplied to the rest of the common electrodes CE is a common electrode voltage used as a display voltage corresponding to a pixel voltage and a common electrode load free driving signal Vcom_LFD.

Figure 33:
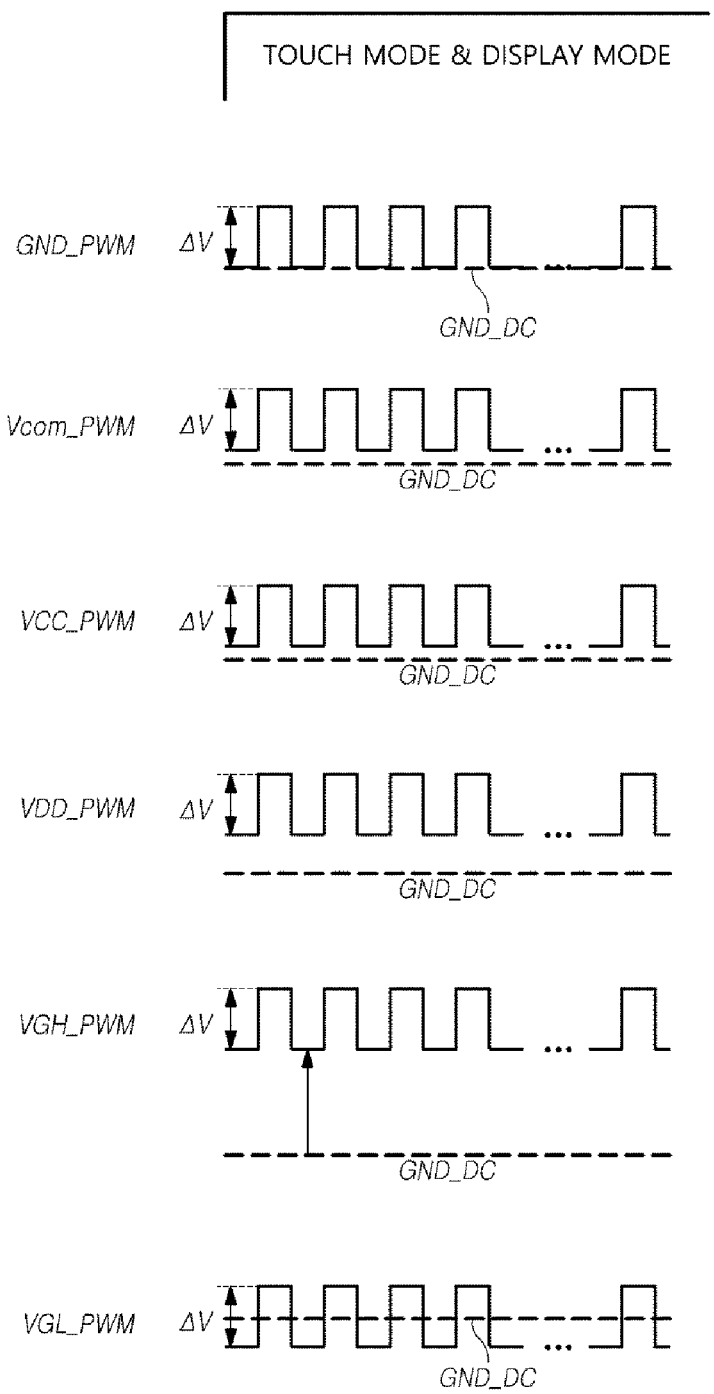
FIG. 33 illustrates the main signals when a display mode and a touch mode are simultaneously performed in the touch sensitive display device according to the exemplary embodiments of the present invention.

FIG. 33 illustrates main signals when a display mode and a touch mode are simultaneously performed in the touch sensitive display device 100 according to the exemplary embodiments of the present invention.

Referring to FIG. 33, the modulated common electrode voltage Vcom_PWM, the first modulated power supply voltage VCC_PWM, the second modulated power supply voltage VDD_PWM, the modulated gate high-level supply voltage VGH_PWM, and the modulated gate low-level supply voltage VGL_PWM, which the power control circuit 150 generates and outputs based on the modulated ground voltage GND_PWM, have the same phase and amplitude ($\Delta V$ or $\Delta V*N$) as the modulated ground voltage GND_PWM.

In cases where a display mode and a touch mode are simultaneously performed as in the cases B and C, the modulated common electrode voltage Vcom_PWM serves not only as a display voltage corresponding to a pixel voltage in order to perform the display mode, but also as a touch driving signal TDS for touch driving and a load free driving signal Vcom_LFD for load free driving.

In cases where a display mode and a touch mode are simultaneously performed as in the cases B and C, the first modulated power supply voltage VCC_PWM, the second modulated power supply voltage VDD_PWM, the modulated gate high-level supply voltage VGH_PWM, and the modulated gate low-level supply voltage VGL_PWM serve as load free driving signals for load free driving, as well as display voltages for performing the display mode.

Figure 34:
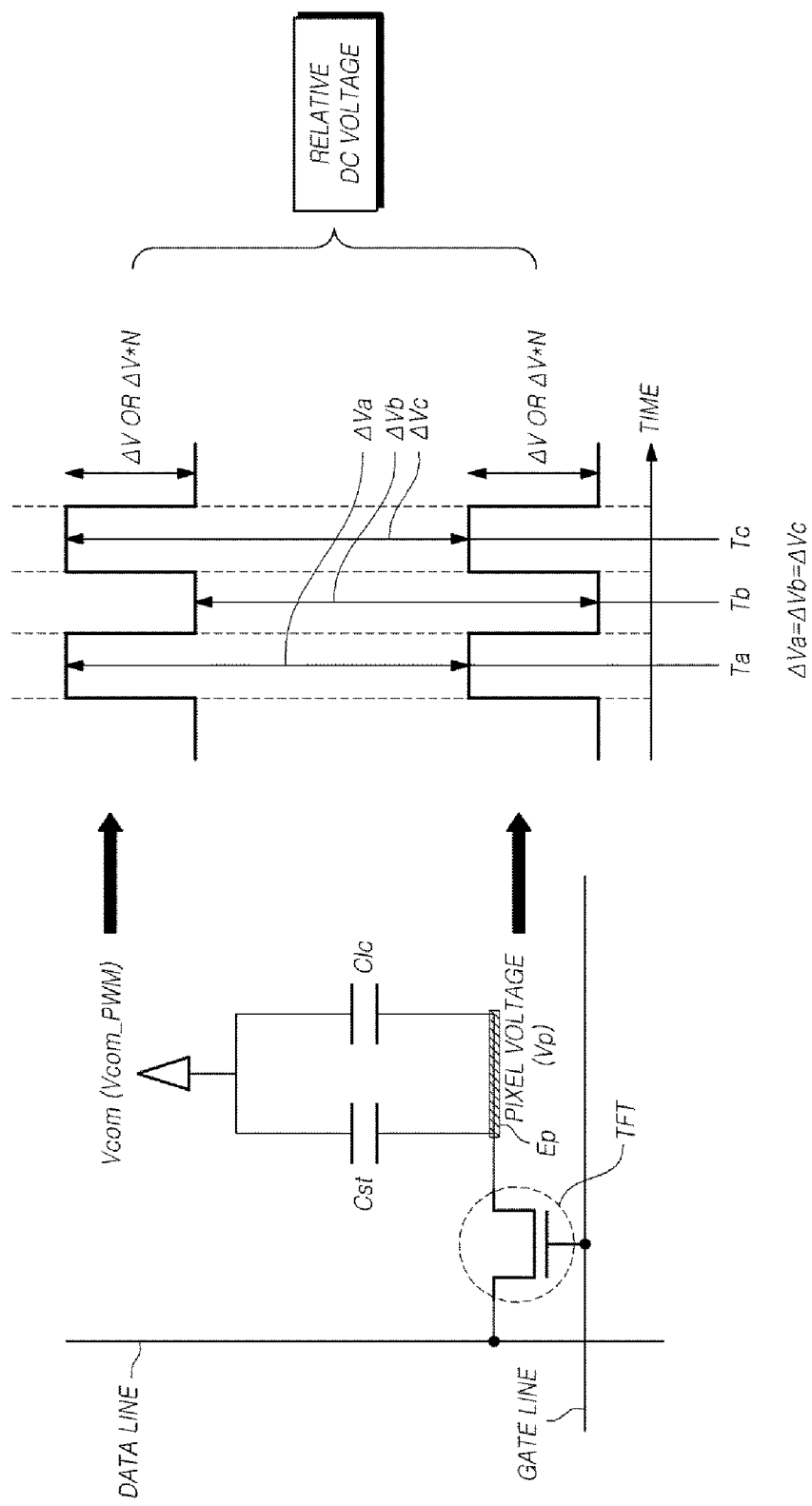
FIG. 34 is a diagram for explaining a display principle in a display mode that is simultaneously performed with a touch mode in the touch sensitive display device according to the exemplary embodiments of the present invention.

FIG. 34 is a diagram for explaining a display principle in a display mode that is simultaneously performed with a touch mode in the touch sensitive display device 100 according to the exemplary embodiments of the present invention.

FIG. 34 illustrates an equivalent circuit schematically showing one sub-pixel that is defined by a data line and a gate line, a pixel voltage Vp applied to a pixel electrode Ep that is connected to a drain node or a source node of a transistor TFT in one sub-pixel, and a modulated common electrode voltage Vcom_PWM as a common voltage Vcom that is commonly applied to all sub-pixels.

Referring to FIG. 34, the transistor TFT in which the gate node is connected to the gate line when the source node or the drain node is connected to the data line, and the drain node or the source node is connected to the pixel electrode Ep, and a storage capacitor Cst and a liquid crystal capacitor Clc that are formed between the pixel electrode Ep and a common electrode CE exist in the sub-pixel.

The transistor TFT is turned on by a scan signal that is supplied through the gate line and supplies, to the pixel electrode Ep, a data voltage that is supplied through the data line.

Capacitance may be generated in the storage capacitor Cst and the liquid crystal capacitor Clc by the pixel voltage Vp, which is the data voltage applied to the pixel electrode Ep, and the modulated common electrode voltage Vcom_PWM as the common voltage Vcom that is applied to the common electrode CE. Accordingly, light can be emitted from the corresponding sub-pixel.

Meanwhile, when the display mode period and the touch mode period overlap each other in time as illustrated in FIG. 33, that is, when the display mode is simultaneously performed together with the touch mode, the modulated common electrode voltage Vcom_PWM and the modulated display supply voltages (e.g., VCC_PWM, VDD_PWM, VGH_PWM, and VGL_PWM) have the same phase and amplitude as the modulated ground voltage GND_PWM. In addition, the pixel voltage Vp also has the same phase and amplitude as the modulated ground voltage GND_PWM.

However, in order to display a desired image through the corresponding sub-pixel, the voltage corresponding to a potential difference between the pixel electrode Ep and the common electrode CE should be a DC voltage for displaying the desired image.

To this end, as the touch mode and the display mode are simultaneously performed, even though neither the pixel voltage Vp applied to the pixel electrode Ep nor the modulated common electrode voltage Vcom_PWM applied to the common electrode CE is a DC voltage, when the voltage level swings at the same phase while the difference between the pixel voltage Vp applied to the pixel electrode Ep and the modulated common electrode voltage Vcom_PWM applied to the common electrode CE is maintained at the same level at all points Ta, Tb, and Tc ($\Delta Va=\Delta Vb=\Delta Vc$), the voltage corresponding to the voltage difference ($\Delta Va$, $\Delta Vb$, and $\Delta Vc$) between the pixel voltage Vp applied to the pixel electrode Ep and the modulated common electrode voltage Vcom_PWM applied to the common electrode CE seems like a (relative) DC voltage at all the points Ta, Tb, and Tc.

Namely, the pixel voltage Vp in the pixel electrode Ep is a pulse width modulation signal that has the same phase and amplitude as the modulated ground voltage GND_PWM.

Further, the voltage difference between the pixel voltage Vp in the pixel electrode Ep and the modulated common electrode voltage Vcom_PWM is the same at all the points Ta, Tb, and Tc ($\Delta Va=\Delta Vb=\Delta Vc$).

Accordingly, the corresponding sub-pixel may display a desired image by normally performing the display mode even though the touch mode and the display mode are simultaneously performed.

Meanwhile, in the method (case A) in which a touch mode and a display mode are performed while being separated from each other in a time-division manner, it is difficult to enhance the touch sensing speed and the quality of display at the same time because restricted time has to be divided into two periods (the touch mode period and the display mode period).

However, since the methods for case B and case C can be normally carried out as described above, namely, since the touch mode and the display mode, which are two driving modes that use all the common electrodes CE, can be simultaneously performed, it is possible to simultaneously achieve an improvement in the touch sensing speed and an improvement in the quality of display.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A touch sensitive display device comprising:
   a display panel that comprises a plurality of common electrodes, the common electrodes used for touch electrodes and display electrodes;
   a driving circuit to supply a common voltage to at least one common electrode of the common electrodes;
   a first ground wring disposed in the display panel;
   a second ground wiring to which a non-modulated ground voltage is applied; and a circuit to provide a modulated ground voltage to the first ground wiring, wherein the driving circuit is electrically connected to the at least one common electrode through a signal line, and the driving circuit senses the at least one common electrode of the common electrodes through the signal line to detect a touch.

2. The touch sensitive display device of claim 1, wherein the driving circuit senses the at least one common electrode to detect the touch during the period in which the modulated ground voltage is provided to the first ground wiring by the circuit.

3. The touch sensitive display device of claim 1, wherein the driving circuit senses the at least one common electrode supplied with the common voltage.

4. The touch sensitive display device of claim 1, wherein the modulated ground voltage is a signal to which the non-modulated ground voltage swings.

5. The touch sensitive display device of claim 1, further comprising a third ground wiring for transmitting the modulated ground voltage output from the circuit to the first ground wiring.

6. The touch sensitive display device of claim 5, further comprising a multiplexer for electrically connecting the third ground wiring and the circuit, wherein the multiplexer receives the modulated ground voltage from the circuit and the non-modulated ground voltage and supplies one of the modulated ground voltage and the non-modulated ground voltage to the third ground wiring.

7. The touch sensitive display device of claim 1, wherein pixel electrodes are disposed on the display panel, wherein an electrical field for image display is formed by the common voltage supplied to the at least one common electrode and a pixel voltage applied to each pixel electrode.

8. The touch sensitive display device of claim 1, wherein the modulated ground voltage has a plurality of pulses.

9. The touch sensitive display device of claim 1, wherein the driving circuit supplies a data voltage to a plurality of data lines arranged on the display panel.

10. A touch sensitive display device comprising:

a display panel that comprises a plurality of common electrodes, the common electrodes used for touch electrodes and display electrodes;

a driving circuit to supply a common voltage to at least one common electrode of the common electrodes;

a first ground wring disposed in the display panel;

a circuit to provide a modulated ground voltage to the first ground wiring; and a level shifter for converting the level of the modulated ground voltage output from the circuit, wherein the driving circuit is electrically connected to the at least one common electrode through a signal line, and the driving circuit senses the at least one common electrode of the common electrodes through the signal line to detect a touch.

* * * * *